US011017691B2

(12) United States Patent
Belch et al.

(10) Patent No.: US 11,017,691 B2
(45) Date of Patent: *May 25, 2021

(54) TRAINING USING TRACKING OF HEAD MOUNTED DISPLAY

(71) Applicant: STRIVR Labs, Inc., Menlo Park, CA (US)

(72) Inventors: Derek Belch, Menlo Park, CA (US); Jeremy Bailenson, Redwood City, CA (US); Michael Casale, Hermosa Beach, CA (US); Michael Manuccia, Alexandria, VA (US)

(73) Assignee: STRIVR Labs, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,447

(22) Filed: Jan. 24, 2020

(65) Prior Publication Data

US 2020/0160746 A1    May 21, 2020

Related U.S. Application Data

(63) Continuation of application No. 15/177,332, filed on Jun. 8, 2016, now Pat. No. 10,586,469.

(Continued)

(51) Int. Cl.
| | |
|---|---|
| *G09B 19/00* | (2006.01) |
| *G09B 5/02* | (2006.01) |
| *G06K 9/00* | (2006.01) |
| *H04N 5/247* | (2006.01) |
| *H04N 5/262* | (2006.01) |
| *H04N 5/232* | (2006.01) |

(Continued)

(52) U.S. Cl.
CPC ......... *G09B 19/0038* (2013.01); *F16M 11/04* (2013.01); *G06K 9/00342* (2013.01);
(Continued)

(58) Field of Classification Search
CPC .... G09B 19/0038; G09B 5/02; G11B 27/105; G11B 27/107; F16M 11/00
See application file for complete search history.

(56) References Cited

U.S. PATENT DOCUMENTS

| | | |
|---|---|---|
| 5,882,204 A | 3/1999 | Iannazo et al. |
| 6,710,713 B1 | 3/2004 | Russo |

(Continued)

OTHER PUBLICATIONS

Ahn et al., Using automated facial expression analysis for emotion and behavior prediction, 2010, *Handbook of Emotions and Mass Media*, pp. 349-369, Routledge: London/New York.

(Continued)

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

Embodiments can use a model for training according to embodiments of the present disclosure. In some embodiments, a model can be created from actual video. The model can be a spherical video. In this manner, users can be immersed in real situations, and thus the user can get more experience than the user otherwise would have had. Various technical features can be provided for enhancing such a system, e.g., synchronization of pointers on two screens, camera rigs with extended view to allow the camera rig to be placed further from a location of the players, analytics for rating users and controlling playback of a next play (action interval), and for allowing a user to feel translation while in a model.

40 Claims, 22 Drawing Sheets

Related U.S. Application Data

(60) Provisional application No. 62/274,033, filed on Dec. 31, 2015, provisional application No. 62/172,756, filed on Jun. 8, 2015.

(51) Int. Cl.
    *G11B 27/10*     (2006.01)
    *F16M 11/04*     (2006.01)
    *G06K 9/20*     (2006.01)

(52) U.S. Cl.
    CPC .............. *G09B 5/02* (2013.01); *G11B 27/105* (2013.01); *G11B 27/107* (2013.01); *H04N 5/232* (2013.01); *H04N 5/247* (2013.01); *H04N 5/2628* (2013.01); *G06K 2009/2045* (2013.01)

(56) References Cited

U.S. PATENT DOCUMENTS

| | | | |
|---|---|---|---|
| 8,228,372 | B2 | 7/2012 | Griffin |
| 8,678,894 | B2 | 3/2014 | Thomas et al. |
| 8,690,655 | B2 | 4/2014 | Meyer et al. |
| 10,158,826 | B2 | 12/2018 | Waters |
| 2004/0104935 | A1 | 6/2004 | Williamson et al. |
| 2006/0017654 | A1 | 1/2006 | Romo |
| 2006/0281061 | A1* | 12/2006 | Hightower ............. A63B 71/06 434/247 |
| 2008/0191864 | A1 | 8/2008 | Wolfson |
| 2009/0091583 | A1 | 4/2009 | McCoy |
| 2009/0189982 | A1 | 7/2009 | Tawiah |
| 2009/0278917 | A1 | 11/2009 | Dobbins et al. |
| 2011/0008761 | A1 | 1/2011 | Hakopian et al. |
| 2011/0270135 | A1 | 11/2011 | Dooley et al. |
| 2014/0287391 | A1 | 9/2014 | Krull |
| 2015/0116316 | A1 | 4/2015 | Fitzgerald et al. |
| 2015/0380052 | A1 | 12/2015 | Hamer |
| 2016/0015109 | A1 | 1/2016 | Anwar |
| 2016/0314620 | A1 | 10/2016 | Reilly et al. |
| 2017/0315611 | A1* | 11/2017 | Mikhailov ......... G02B 27/0172 |

OTHER PUBLICATIONS

Bailenson et al., The Use of Immersive Virtual Reality in the Learning Sciences: Digital Transformations of Teachers, Students, and Social Context, *J. of the Learning Sciences*, 2008, 17:102-141.

Bailenson, Jeremy, Protecting Nonverbal Data Tracked in Virtual Reality, published online Aug. 6, 2018, *JAMA Pediatrics*, doi:10.1001/jamapediatrics. 2018.1909.

Jabon et al., Automatically Analyzing Facial-Feature Movements to Identify Human Errors, 2011, *IEEE J of Intelligent Systems*, 26(2):54-63.

Jabon et al., Facial-Expression Analysis for Predicting Unsafe Driving Behavior, 2011, *IEEE Pervasive Computing*, 10(4):84-95.

Li et al., A Public Database of Immersive VR Videos with Corresponding Ratings of Arousal, Valence, and Correlations between Head Movements and Self Report Measures, *Frontiers in Psychology*, Dec. 2017, 8:2116, 10 pages.

Rizzo et al., Diagnosing Attention Disorders in a Virtual Classroom, *Computer*, 2004, 37(6): 87-89.

Won et al., Tracking gestures to detect gender, *Proceedings of the Int Soc for Presence Research Annual Conf*, Oct. 24-26, 2012, Philadelphia, Pennsylvania, USA.

Won et al., Automatically Detected Nonverbal Behavior Predicts Creativity in Collaborating Dyads, *J Nonverbal Behav*, 2014, 38(3):389-408.

Won et al., Automatic Detection of Nonverbal Behavior Predicts Learning in Dyadic Interactions, *IEEE Transactions on Affective Computing*, Apr.-Jun. 2014, 5(2): 112-125.

Won et al., Identifying Anxiety Through Tracked Head Movements in a Virtual Classroom, *Cyberpsychology, Behavior, and Social Networking*, 2016, 19(6):380-387.

Feldman, Bruce, "'I was blown away': Welcome to football's quarterback revolution," Fox Sports, Mar. 11, 2015, http://www.foxsports.com/college-football/story/stanford-cardinal-nfl-vir-tual-reality-qb-training-031115?curator=SportsREDEF, 14 pp.

Rothstein, Michael, "Lions using ladder cam to help Stafford," ESPN Blog, Jun. 11, 2014, http://www.espn.com/blog/detroit-lions/post/_/id/8580/to-help-stafford-th-e-lions-using-ladder-cam, 2 pp.

Dreier, T., "ViewCast and BigLook360 Put Viewers on the Grammy Red Carpet," Feb. 8, 2013, StreamingMedia.com, http://www.streamingmedia.com/Articles/News/Online-Video-News/ViewCast-an-d-BigLook360-Put-Viewers-on-the-Grammy-Red-Carpet-87628.aspx, 2 pp.

Bideau, Benoit et al.; "Using Virtual Reality to Analyze Sports Performance"; IEEE Computer Graphics and Applications; Mar./Apr. 2010; pp. 14-21.

Non-Final Office Action dated Jun. 3, 2019 in U.S. Appl. No. 15/177,332, filed Jun. 8, 2016. 15 pages.

Notice of Allowance dated Oct. 8, 2019 in U.S. Appl. No. 15/177,332, filed Jun. 8, 2016. 11 pages.

\* cited by examiner

100

```
Obtain one or more video files for an action interval for a player of a particular
sport
110
          │
          ▼
Process the video files to create visual reality (VR) models for the decision
situations (e.g., plays)
120
          │
          ▼
Create one or more enhancement models (e.g., weather or visual obstacles)
130
          │
          ▼
Receive user input
140
          │
          ▼
Provide a VR model to one or more head-mounted displays
150
          │
          ▼
Track player interactions with the VR model
160
          │
          ▼
Analyze the player interactions
170
          │
          ▼
Provide analysis of the player interactions
180
```

```
┌─────────────────────────────────────────────────────────────┐
│ storing the spherical video in a memory of the computer     │
│ system, the memory communicably coupled with one or more    │
│ processors of the computer system                           │
│                          610                                │
└─────────────────────────────────────────────────────────────┘
                              │
                              ▼
┌─────────────────────────────────────────────────────────────┐
│ receiving tracking information from one or more sensors on  │
│ a head-mounted display, the tracking information providing  │
│ an orientation of the head-mounted display                  │
│                          620                                │
└─────────────────────────────────────────────────────────────┘
                              │
                              ▼
┌─────────────────────────────────────────────────────────────┐
│ determining a portion of the spherical video based on the   │
│ tracking information                                        │
│                          630                                │
└─────────────────────────────────────────────────────────────┘
                              │
                              ▼
┌─────────────────────────────────────────────────────────────┐
│ providing the portion of the spherical video from the       │
│ computer system to the head-mounted display for displaying  │
│ on a display screen of the head-mounted display             │
│                          640                                │
└─────────────────────────────────────────────────────────────┘
                              │
                              ▼
┌─────────────────────────────────────────────────────────────┐
│ detecting, using a detector communicably coupled with the   │
│ computer system, a translational movement of the head-      │
│ mounted display while the head-mounted display is           │
│ displaying the portion of the spherical video, wherein the  │
│ detector detects a signal associated with a stationary      │
│ device, the signal providing a relative distance from the   │
│ stationary device to the head-mounted display               │
│                          650                                │
└─────────────────────────────────────────────────────────────┘
                              │
                              ▼
┌─────────────────────────────────────────────────────────────┐
│ determining an amount of the translational movement based   │
│ on the detected signal                                      │
│                          660                                │
└─────────────────────────────────────────────────────────────┘
                              │
                              ▼
┌─────────────────────────────────────────────────────────────┐
│ determining a position of the user away from a central      │
│ point of the spherical video as a result of the             │
│ translational movement                                      │
│                          670                                │
└─────────────────────────────────────────────────────────────┘
                              │
                              ▼
┌─────────────────────────────────────────────────────────────┐
│ zooming in or out of the portion of the spherical video     │
│ based on the position of the user                           │
│                          680                                │
└─────────────────────────────────────────────────────────────┘
```

FIG. 6

700 storing the spherical video in a memory of the computer system, the memory communicably coupled with one or more processors of the computer system
710 identifying a center position of the spherical video
720 determining a displaced position that is a specified distance from the center position, wherein the displaced position is where the spherical video starts
730 receiving tracking information from one or more sensors on a head-mounted display, the tracking information providing an orientation of the head-mounted display
740 determining a portion of the spherical video based on the tracking information
750 zooming in or out of the portion of the spherical video based on the specified distance to obtain a zoomed portion of the spherical video
760 providing the zoomed portion of the spherical video from the computer system to the head-mounted display for displaying on a display screen of the head-mounted display
770

FIG. 7

900 storing the spherical video in a memory of the computer system, the memory communicably coupled with one or more processors of the computer system
910 receiving tracking information from one or more sensors of a head-mounted display, the tracking information providing a first orientation of the head-mounted display
920 determining a portion of the spherical video based on the tracking information
930 providing the portion of the spherical video from the computer system to the head-mounted display for displaying on a display screen of the head-mounted display, the portion of the spherical video being a two-dimensional video
940 providing the two dimensional video from the computer system to a display device for displaying on the separate screen in synchronization with the head-mounted display
950 receiving location information from a pointing device, the location information identifying a location of a first visible pointer on the separate screen, wherein the location changes in a manner dependent on a second orientation of the pointing device
960 determining a virtual position on the display screen that corresponds with the location of the first visible pointer on the two-dimensional screen
970 generating, at the virtual position on the mounted screen, a virtual pointer in the portion of the spherical video provided to the head-mounted display
980

Storing spherical videos
1110

↓ for each of a plurality of calibration users, do FIG. 11B
1120

↓ for each of the one or more statistical parameters, analyzing the statistical values of the plurality of calibration users to determine a cluster of the calibration statistical values
1130

↓ for a test user, repeating tracking information of the test user over the plurality of times for a respective spherical video, determining a test statistical distribution of values of the orientation from the playback orientation information of the test user, and determining a test statistical value for the one or more statistical parameters of the test statistical distribution;
1140

↓ for each of the one or more statistical parameters, comparing the test statistical value to the corresponding cluster to determine a separation distance between the test statistical value and the corresponding cluster
1150

↓ determining a similarity score between movements of the test user and movements of the plurality of calibration users based on the one or more separation distances
1160

FIG. 11A

1100 receiving tracking information from one or more sensors of a head-mounted display, the tracking information providing an orientation of the head-mounted display
1121 determining a portion of a respective spherical video that is being viewed by a calibration user based on the tracking information
1122 providing the portion of the respective spherical video from the computer system to the head-mounted display for displaying on a display screen of the head-mounted display
1123 storing the tracking information at a plurality of times over playback of the respective spherical video to obtain playback orientation information of the calibration user
1124 determining a statistical distribution of values of the orientation from the playback orientation information of the calibration user
1125 determining a calibration statistical value for one or more statistical parameters of the statistical distribution
1126

FIG. 11B

TRAINING USING TRACKING OF HEAD MOUNTED DISPLAY

CROSS-REFERENCE TO RELATED APPLICATIONS

This application is a continuation of Non-Provisional U.S. patent application Ser. No. 15/177,332, filed Jun. 8, 2016, which claims the benefit of and priority to U.S. Provisional Application No. 62/172,756, filed on Jun. 8, 2015, and U.S. Provisional Application No. 62/274,033, filed on Dec. 31, 2015. These applications are hereby incorporated by reference in their entirety for all purposes.

BACKGROUND

In sports, players can have limited time to practice for a variety of reasons, e.g., due to league rules, a player is a backup, weather, injury, etc. Thus, players might not develop decision making abilities as quickly as desired. Players can watch game films and/or watch others practice to see what other people do. But such game films do not optimally develop decision-making capabilities of the person because they rarely, if ever, provide a first-person perspective of what the player sees on the field of play.

BRIEF SUMMARY

Embodiments herein can use virtual reality (VR) for sports training according to the present disclosure. In some embodiments, a VR model can be created from actual video of players. The VR model can be a spherical video. In this manner, players can be immersed in real situations, and thus the player can get more experience than the player otherwise would have had. Various technical features can be provided for enhancing such a system, e.g., synchronization of pointers on two screens, camera rigs with extended view to allow the camera rig to be placed further from a location of the players, analytics for rating players and controlling playback of a next play (action interval), and for allowing a head-mounted display to incorporate translation movements of a user during a presentation of a spherical video.

Other embodiments are directed to systems, portable consumer devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 1 is a flowchart illustrating a method for using virtual reality (VR) for sports training.

FIG. 6 is a flowchart illustrating an embodiment of a process for providing a virtual reality (VR) model including a spherical video.

FIG. 7 is a flowchart illustrating an embodiment of a process for adjusting a virtual reality (VR) model including a spherical video.

FIG. 9 is a flowchart illustrating an embodiment of a process for synchronizing pointers in a virtual reality (VR) model including a spherical video and on a separate screen.

FIGS. 11A-11B are flowcharts illustrating an embodiment of a process for measuring movement of users in a virtual reality (VR) model including a spherical video.

DETAILED DESCRIPTION

I. Overview

Figure 2A:
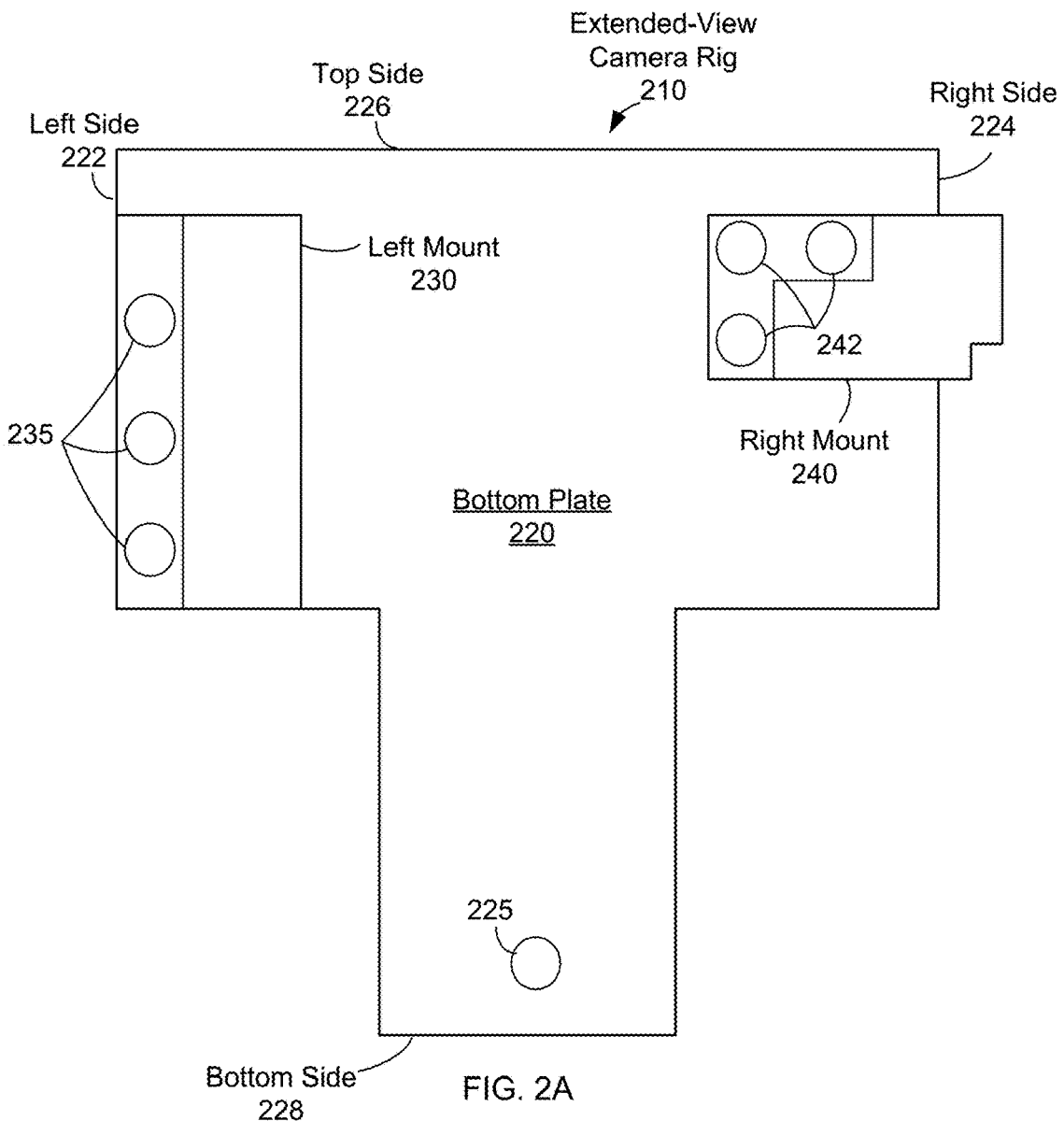
FIGS. 2A-2B illustrate an example of an extended-view camera rig from various angles.

FIG. 1 is a flowchart illustrating a method 100 for using virtual reality (VR) for sports training according to embodiments of the present disclosure. Method 100 can be used to create VR models from physical footage of players for training a particular player, e.g., a quarterback, a running back, a linebacker, a safety, defensive tackle, a receiver, a midfielder, a forward, a batter, or any other kind of player for any other sport. One or more blocks of method 100 can be optional. In some examples, the player can wear a head-mounted display for presenting a VR model, such as a spherical video. In some examples, a portion of the spherical video viewed by the player can be provided to other displays to be viewed by other users (e.g., a second screen).

At block 110, one or more video files can be obtained for an action interval from a perspective of a player for a particular sport. The action interval can involve a time period when the player performs an action. The action interval can involve a decision to be made by the player. The action interval can be for a set play, e.g., a shotgun pass in football. Other examples of action intervals can include breakaways in basketball or soccer, pitch recognition in baseball, or other situations that a player might encounter during a game. Multiple video files can be obtained for each action interval. The multiple video files for a given play can be obtained using a camera rig with one or more cameras. The camera rig can be placed at a specific place while other players move around the camera rig.

In some embodiments, obtaining the one or more video files can be performed by receiving the video files at a computer system. In other embodiments, the obtaining can involve recording a scene for a time period using a camera rig.

At block 120, one or more video files can be processed to create a VR model for the action interval (e.g., a play). In the case of multiple video files, the multiple video files can be recorded simultaneously from a camera rig and processed (e.g., combined) to create the VR model.

At block 130, one or more enhancement models can be optionally created to be applied to the VR model. The one or more enhancement models can enhance the final VR scene that a user interacts with. In some examples, an enhancement model of the one or more enhancement models can be applied to multiple VR models. The enhancement model can include a weather model that simulates a particular types of weather (e.g., rain, snow, glare, etc.) As another example, the enhancement model can include one or more visual obstacles. Such enhancements can add different contexts or difficulties that can help to train a player experiencing the enhanced VR model.

At block 140, user input can be received. For example, a user can select a VR model for a particular play. The user can be the player to be immersed into the VR model or another person (e.g., a coach). For example, the coach can use a pointing device (e.g., a mouse or a pointing device) to identify a location on a separate display where the VR model can be selected. In some embodiments, the user immersed into the VR model can see the coach select the VR model through a selection video on a head-mounted display.

At block 150, the VR model can be provided to one or more head-mounted displays. In some embodiments, a first user can wear a first head-mounted display and a second user can wear a second head-mounted display. In such embodiments, the first head-mounted display can act as a master unit that controls the images rendered by the VR model, and the second head-mounted display can act as a slave unit that duplicates what the first head-mounted display presents.

At block 160, player interactions with the VR model using a head-mounted display can be tracked. For example, head movements of the player wearing the head-mounted display can be tracked. Such player interactions can be tracked at specified time intervals, with the data being stored with time markers.

At block 170, the player interactions can be analyzed. The analysis can be performed in a variety of ways. For example, the player interactions can be compared to a plurality of reference patterns, with each pattern corresponding to a certain assessment level. Assessment levels can include acceptable, not acceptable, excellent, poor, and the like.

All or part of the player interactions can be tracked. For example, a particular time period (e.g., 10-20 seconds) can be analyzed separately from the first 10 seconds. The separate segments can be compared to different sets of reference patterns.

At block 180, the analysis of the player interactions can be provided. The analysis can be provided in a variety of ways. For example, the analysis can be provided as a report including numerical values, using video playback with annotations, or by updating a VR model for more training.

II. Obtaining Video Files for Plays

A. Hardware

A camera rig can be used to obtain one or more video files. The camera rig can include one or more cameras for capturing one or more images and/or one or more videos. The camera rig can be configured such that an entire environment can be captured for 360 degrees around the camera rig. In other words, the camera rig can be configured such that there are no blank patches within a spherical area around the camera rig. Below, configurations for a camera rig are described. While each configuration is different, the configurations ensure that the entire environment is captured by the one or more cameras.

In some embodiments, two or more cameras can be synchronized. For example, a remote signal from a wired or wireless device can be sent to each of the two or more cameras. The remote signal can cause the two or more cameras to perform one or more functions on each camera at the same time. A function can include turning on the cameras, pausing the cameras, stopping the cameras, etc. In some examples, a synchronization mechanism can be used to simultaneously activate the two or more. In some embodiments, the remote signal can be the same for each of the cameras. A function of an individual camera can also be controlled by a remote signal from a wired or wireless device. For example, a camera can be zoomed in or out while the other cameras remain at a particular level of zoom.

1. 6 Camera Rig

In some embodiments, the camera rig can include six cameras (e.g., GoPro Hero 4 Blacks). The six cameras can be arranged in a cube format, with each camera on each side of a cube. An example of a camera rig to facilitate the cube format is the Freedom360 Mount (found at freedom360.us/shop/freedom360). The six cameras can be assembled in a monoscopic spherical array with a 3D-printed housing. The monoscopic spherical array can be different than conventional camera rigs, which include a cylindrical stereo array. The monoscopic spherical array can provide greater user comfort, as users can have varying inter-pupillary distances (IPD), which can make viewing stereo uncomfortable for long periods of time for some users. Additionally, the monoscopic spherical array can allow for rotation around the X-axis (roll) of the head. Typical current stereo setups do not allow for roll of the head, which is a motion that players do often, particularly for football players. The camera rig may also be packaged with a number of peripheral devices to assist with capture, such as: a wireless or wired remote to get an approximate synchronization of all cameras, or a cooling mechanism to protect the camera array from overheating during prolonged usage, and various adapters so the rig can attach to various tripods or mounts.

In some embodiments, a plurality of the 6 camera rigs (e.g., 3 of the 6 camera rigs) can be placed on the field at once, allowing for final footage to be synchronously cut between the varying perspectives at a user's command. In some examples, the camera rigs are not located in fixed positions. The camera rigs can be located anywhere on the field, depending on the drill. For example, a camera rig can be set up to capture footage from each of the three linebacker positions. Suitable settings can record each camera at 960p for resolution, 120 frames per seconds (fps), with Pro-Tunes On, and a white balance set for the correct lighting scenario (e.g., 3000 k indoor stadiums and 6500 k for outdoor).

2. Extended-View Camera Rig

In other embodiments, the camera rig can include a first camera, a second camera, and a third camera (this configuration of the camera rig is sometimes referred to as "extended view"). The first camera and the second camera can include a lens with a focal length smaller than the third camera. Example focal lengths can be grouped by ranges, including wide angle with a 14 millimeter to 35 millimeter focal length, standard with a 35 millimeter to 70 millimeter focal length, mild telephoto with a 70 millimeter to 105 millimeter focal length, and telephoto with a 105 millimeter to 300 millimeter focal length. The lens for each of the first and second camera can be in one group while the third camera can be in a longer focal length group. In other embodiments, the lens for each of the first, second, and third camera can be in the same focal length group; however, the focal length associated with the first and second cameras can still be less than the focal length associated with the third camera. Such a camera configuration can reduce the number of cameras used, which can reduce an overall complexity of the workflow. Examples of reduction of overall complexity include reducing: a number of cameras, a number of cameras to charge, a number of memory cards to read, an amount of data stored from each play, a number of cameras that could potentially fail, and a weight of the system. In addition, the third camera can allow for improved ability to zoom in portions that the third camera captures.

In some embodiments, each of the first camera and the second camera can include a wide angle lens (e.g., 35, 28, 24, 21, 20, 18 or 14 millimeter focal length). In some embodiments, each of the first camera and the second camera can include a fish eye lens, which can include an angel of view between 100 and 180 degrees with a focal length of between 8 millimeter and 10 millimeter for circular images and 15 millimeter to 16 millimeter for full-frame images. For cameras using smaller electronic imagers, such as ¼" and ⅓" format Charged Coupling Device (CCD) or Complementary Metal Oxide Semiconductor (CMOS) sensors, the focal length can be as short as 1 millimeter to 2 millimeters. In some examples, the first and second camera can each be a GoPro Hero 4 Black, which includes a CMOS optical sensor, H.264 digital video format, JPEG image recording format, 3840×2160 max video resolution, 12.0 megapixel effective photo resolution, and 6400 ISO (max).

In some embodiments, the first and second camera can each capture the side portions of a scene. For example, the first camera can capture a left side and the second camera can capture a right side. The left side and the right side can be in reference to a football field. For example, a center can be in a direction toward a goal line of the football field from a position that a quarterback is standing. In such an example, the left side can be a portion to the left of the center. The right side can be a portion to the right of the center. The left side and the right side can include portions that are not captured by the third camera.

In some embodiments, the third camera can be higher quality than the first and second cameras. For example, the third camera can include at least one or more of a lens, a sensor, and one or more settings to provide higher resolution and/or frame rate (hereinafter collectively referred to as "quality") than the first and second camera. The one or more settings can affect an effective sensor size (i.e. the area of the optical camera sensor being utilized). A larger effective sensor size can enable a larger field of view for a given camera. Each camera of a camera rig can be positioned to have a sufficient field of view in order to capture the entire sphere of the environment. As mentioned above, the third camera can include a focal length that is longer than each of the first and second camera. For example, the third camera can include a standard lens with a focal length of 35, 40, 45, 50, 55, 60, 65 or 70 millimeters. The third camera can be a Sony Alpha a7s II, a Canon EOS 1DX Mark II, or other similar camera. The Sony Alpha a7s II can include 12.2 megapixels resolution and 35 millimeter sensor size. The Canon EOS 1DX Mark II can include 20.2 megapixels resolution and 35 millimeter sensor size. In some embodiments, the third camera can include 4k resolution and a frame rate of 60 frames per second. In other embodiments, the third camera can include either 4k resolution or a frame rate of 60 frames per second.

In some embodiments, the third camera can capture a portion of a scene that is most important to be viewed. For example, the third camera can capture a middle portion of a scene. In some embodiments, the third camera can provide a clear picture of where action of a play is occurring. In such embodiments, a picture or video of the first and second cameras can be stitched together with a picture or video of the third camera to obtain a combined picture or video.

The third camera can also reduce stitch lines facing forward. For example, the third camera can provide a wide-angle view out in front, where the primary action takes place during a typical football play when the extended camera rig is placed behind the line of scrimmage. In such examples, there are no seam lines (where patches of the spherical video reducing stitch lines facing forward, camera image/video quality is not relevant.

In some examples, the camera rig that holds the first, second, and third camera can be rigid. The camera rig can provide an exact location for each of the first, second, and third camera. By providing an exact location, the cameras can be configured in an orientation that consistently captures a complete image or video of an entire environment from the first, second, and third cameras. In some examples, the camera rig can include three mounts, one for each camera, that are constructed of at least one or more of custom designed parts, machined metal plates, and assorted hardware (e.g., fasteners such as nuts, bolts, and set screws). In some examples, the camera rig can secure the first, second, and third cameras to the camera rig. In such examples, the camera rig can also be securely attached to a stand or tripod, thereby securing the first, second, and third cameras to the stand or tripod.

In some examples, the camera rig can provide a quick release (e.g., access while the cameras are mounted on the rigid camera rig) for a camera storage device (e.g., a memory such as a secure digital (SD) card) and a battery charging device (e.g., a power cord). The camera rig can be organized such that the camera rig does not impede use of a function or setting of a camera, including photo/video settings, triggering a shutter of a camera, and removing a camera storage device. For example, the camera rig can include one or more holes where buttons are located on one or more of the cameras to allow access to the buttons.

In some examples, the first, second, and third cameras can be positioned on the camera rig to achieve overlap of output of the neighboring cameras. For example, a portion of the output of the first camera can overlap a portion of the output of the third camera. In addition, a portion of the output of the second camera can overlap a portion of the output of the third camera. In some examples, a back-to-back spacing between the first camera and the second camera can be 0-6 inches, depending on a size of the cameras used. The back-to-back spacing can include a distance from a back of the first camera and a back of the second camera. In other examples, the back-to-back spacing between the first camera and the second camera can be large enough to facilitate the third camera to fit in between. In some examples, the camera rig can enable the first and second camera to be positioned in landscape or portrait orientation to achieve more efficient overlap between an image or a video from two or more cameras. More efficient overlap can allow a less powerful camera to be used while still receiving overlap due to the different positions of the first and second cameras.

In some examples, the third camera can be positioned between the first and second cameras such that a viewing screen on the third camera is viewable by a user. With such a configuration, the user can use a live preview image on a digital flip-out screen of the third camera to verify that action is being adequately captured within the view of the third camera.

Figure 2B:
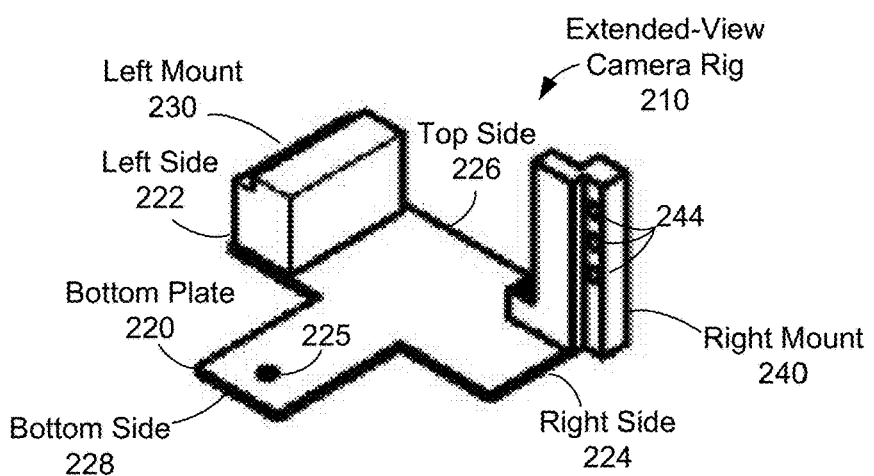

FIGS. 2A-2B illustrate an example of an extended-view camera rig 210 from various angles. FIG. 2A illustrates a top view of the extended-view camera rig 210. The extended-view camera rig 210 can include a bottom plate 220, a left mount 230, and a right mount 240. Each of the bottom plate 220, the left mount 230, and the right mount 240 can be made of at least one or more of metal and plastic. In some examples, the bottom plate 220 can be made of metal and the left mount 230 and the right mount 240 can be made of plastic. The bottom plate 220, the left mount 230, and the right mount 240 can be one piece or different pieces. If different pieces, the left mount 230 can couple to the bottom plate 220 on a left portion of the bottom plate 220. The coupling of the left mount 230 to the bottom plate 220 can use one or more holes 235 in the left mount 230. The one or more holes 235 in the left mount 230 can correspond to one or more holes in the bottom plate 220. In other examples, the coupling of the left mount 230 to the bottom plate 220 can use an adhesive.

In some embodiments, a first camera (as described above) can also couple to the left mount 230. The coupling of the first camera and the left mount 230 can use at least one of the one or more holes 235 in the left mount 230 and a bolt for each of the one or more holes 235. Each bolt can be a ¼-20 bolt. The left mount 230 can be in a landscape orientation, which can mean that a camera coupled to the left mount 230 would be oriented horizontally (making an output of the camera wider than it is tall). In some embodiments, the first camera can couple to the left mount 230 such that an output (image or video) of the first camera does not capture a portion of the extended-view camera rig 210. The first camera can be coupled to the left mount 230 such that the first camera faces in a direction to a left of the extended-view camera rig 210. In some embodiments, the first camera can face at an angle between 60° and 120° from a left side 222 of the bottom plate 220 (e.g., 120°, 115°, 110°, 105°, 100°, 95°, 90°, 85°, 80°, 75°, 70°, 65°, or) 60°.

The right mount 240 can couple to the bottom plate 220 in a right portion of the bottom plate 220. The coupling of the right mount 240 to the bottom plate 220 can use one or more holes 242 in the right mount 240 and a bolt for each of the one or more holes 242. Each bolt can be a ¼-20 bolt. The one or more holes 242 in the right mount 240 can correspond to one or more holes in the bottom plate 220. In other examples, the coupling of the right mount 240 to the bottom plate 220 can use an adhesive.

In some embodiments, a third camera (as described above) can couple to the bottom plate 220 using a hole 225. The hole 225 can allow a ¼-20 bolt to couple with the third camera using a ¼-20 female thread located on a bottom of the third camera, which is a standard coupling component of many cameras. The third camera can be coupled to the bottom plate 220 such that the third camera faces in a forward direction in relation to the extended-view camera rig 210. In some embodiments, the third camera can face at an angle between 60° and 120° from a top side 226 of the bottom plate 220 (e.g., 120°, 115°, 110°, 105°, 100°, 95°, 90°, 85°, 80°, 75°, 70°, 65°, or 60°). In some examples, the third camera can rest on the bottom plate 220. In some examples, a lens of the third camera can be located completely on the bottom plate 220. In other examples, the lens can extend beyond the top side 226 of the bottom plate 220.

FIG. 2B illustrates a top, perspective view of the extended-view camera rig 210. The left mount 230 is illustrated with a notch on a top side of the left mount 230. The notch of the left mount 230 can be where the one or more holes 235 are located (as described in FIG. 2A). The notch can allow for the first camera to sit on a raised portion while the first camera is coupled to the left mount 230 on a lowered portion.

In some embodiments, a second camera (as described above) can couple to the right mount 240. The coupling of the second camera and the right mount 240 can use one or more holes 244 in the right mount 240 and a bolt for each of the one or more holes 244. Each bolt can be a ¼-20 bolt. The one or more holes 244 in the right mount 240 can be located in a notch of the right mount 240. The notch of the right mount 240 can allow for the second camera to sit on a raised portion while the second camera is coupled to the right mount 240 on a lowered portion.

The right mount 240 can be in a portrait orientation, which can mean that a camera coupled to the right mount 240 would be oriented vertically (making an output of the camera taller than it is wide). In some embodiments, the second camera can couple to the right mount 240 such that an output (image or video) of the second camera does not capture a portion of the extended-view camera rig 210. The second camera can be coupled to the right mount 240 such that the second camera faces in a direction to a right of the extended-view camera rig 210. In some embodiments, the second camera can face at an angle between 60° and 120° from a right side 224 of the bottom plate 220 (e.g., 120°, 115°, 110°, 105°, 100°, 95°, 90°, 85°, 80°, 75°, 70°, 65°, or 60°).

In other embodiments, the left mount 230 can be similar to the right mount 240, allowing a camera to be coupled to the left mount 230 in a landscape orientation. In such embodiments, the right mount 240 can be similar to the left mount 230, allowing a camera to be coupled to the right mount 240 in a portrait orientation. In other embodiments, the left and right mounts can be the same orientation, either both portrait or both landscape. In some embodiments, a single mount can facilitate both a portrait orientation and a landscape orientation. In such embodiments, the single mount can be a combination of the left mount 230 and the right mount 240. In some embodiments, left mounts and right mounts can be interchangeable. A choice of a portrait orientation or a landscape orientation can depend on a field of view of cameras included in the extended-view camera rig 210. In some examples, a camera in a portrait orientation and a camera in a landscape orientation can better capture a sphere around the extended-view camera rig 210.

Figure 2C:
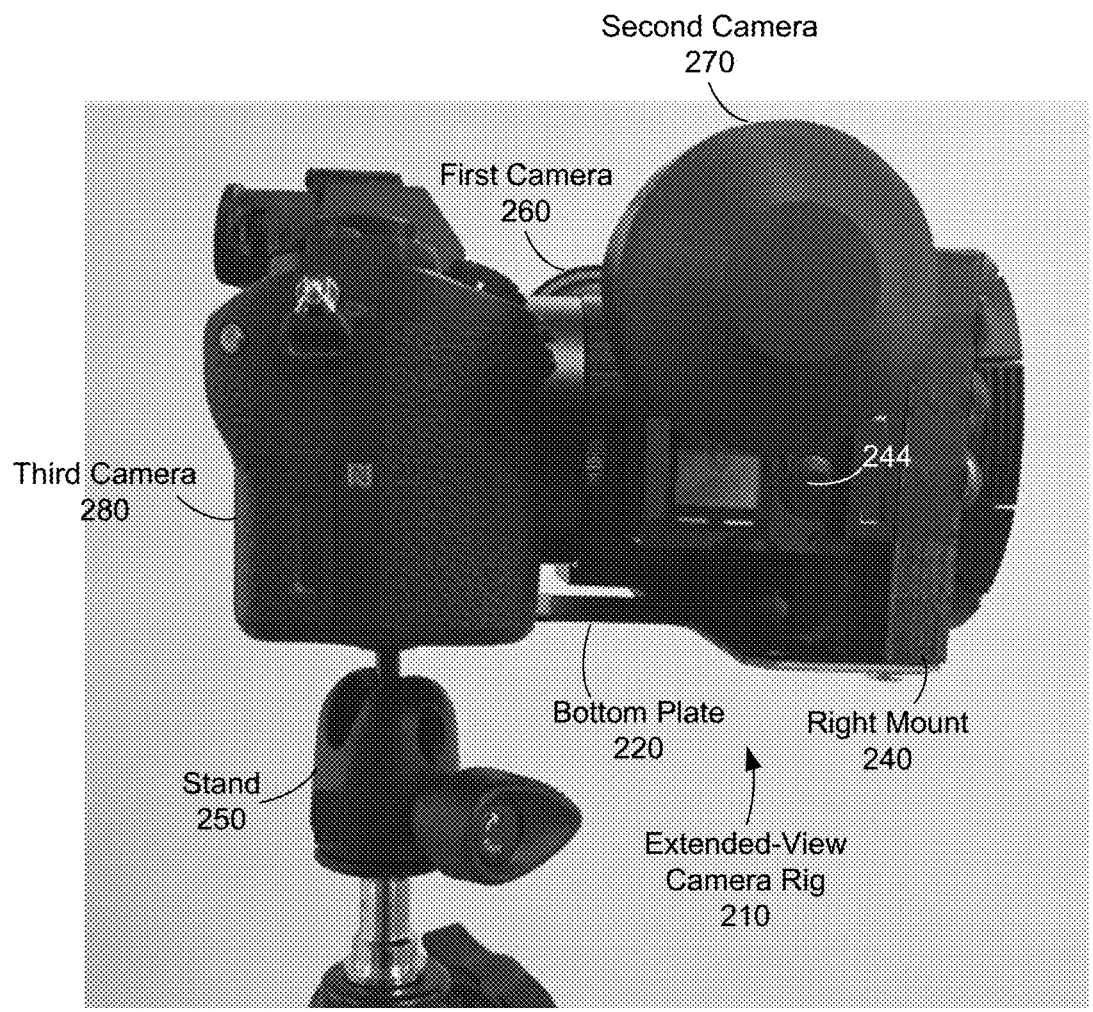
FIG. 2C illustrates a side view of an extended view camera rig coupled with a first camera, a second camera, and a third camera.

FIG. 2C illustrates a side view of the extended-view camera rig 210 coupled with a first camera 260, a second camera 270, and a third camera 280. In FIG. C, the bottom plate 220 is visible. As described above, the bottom plate 220 can couple with the third camera 280. The third camera 280 can be coupled with the bottom plate 220 using a bolt from a stand 250. For example, the stand 250 can couple with the bottom plate 220 and the third camera 280 through a single bolt that is a part of the stand 250.

In FIG. 2C, the right mount 240 is also visible. As discussed above, the right mount 240 can be coupled to the second camera 270 using one or more holes 244. While only one of the one or more holes 244 is visible, the second camera 270 can be coupled to the right mount 240 using more than one hole. In this example, the second camera 270 is shown in a portrait orientation. The first camera 260 is also visible in FIG. 2C. While the left mount 230 is not visible, the first camera 260 can be coupled to the left mount 230 as described above. In this example, the first camera 260 is shown in a landscape orientation.

When the first, second, and third camera are installed into the camera rig, a stitching process to combine output of the cameras can be configured. The configuration can determine how to combine the output of the cameras. The configuration can also determine how to synchronize the playback of the cameras. The camera rig can reduce a need to recalibrate the stitching process for the outputs of cameras because the cameras can maintain spatial relations which each other. For example, the first, second, and third camera can be configured such that as long as the first, second, and third cameras are in the same position that the stitching process can properly combine the outputs.

Other configurations for a camera rig can be used. For example, a camera that can capture an environment in every direction can be used. In such an example, only one camera would be needed to capture an entire environment. For another example, a camera with a 360° spherical curves lens can be used (e.g., Kodak Pixpro SP360). In such an example, two Kodak Pixpro Sp360s cameras can be installed back to back on a camera rig such that an entire environment is captured.

B. Use and Placement of Camera Rig

In some embodiments, the camera rig (i.e. a multiple-camera rig) can be placed in a position on a field based on a type of play and a player to be represented. The multiple camera rig can be placed at a location associated with where the player would normally be at during the action interval of a football play, e.g., at the same position, but with the actual player at separated distance. Examples of plays can include standard football plays and 7-on-7 football drills. The standard football play can include 11 offensive players and 11 defensive players. The 7-on-7 football drill can include seven or more offensive players and seven defensive players. Other numbers of offensive and defensive players can be included.

In some embodiments, the camera rig can be mounted to a stand (e.g., a tripod) and adjusted to a height of an approximate player (e.g., 6'1"). FIGS. 3A-3I illustrate examples of camera rig positions for particular players in particular types of plays. In the examples, offensive plays will be illustrated in black, and defensive players will be illustrated in blue.

Figure 3A:
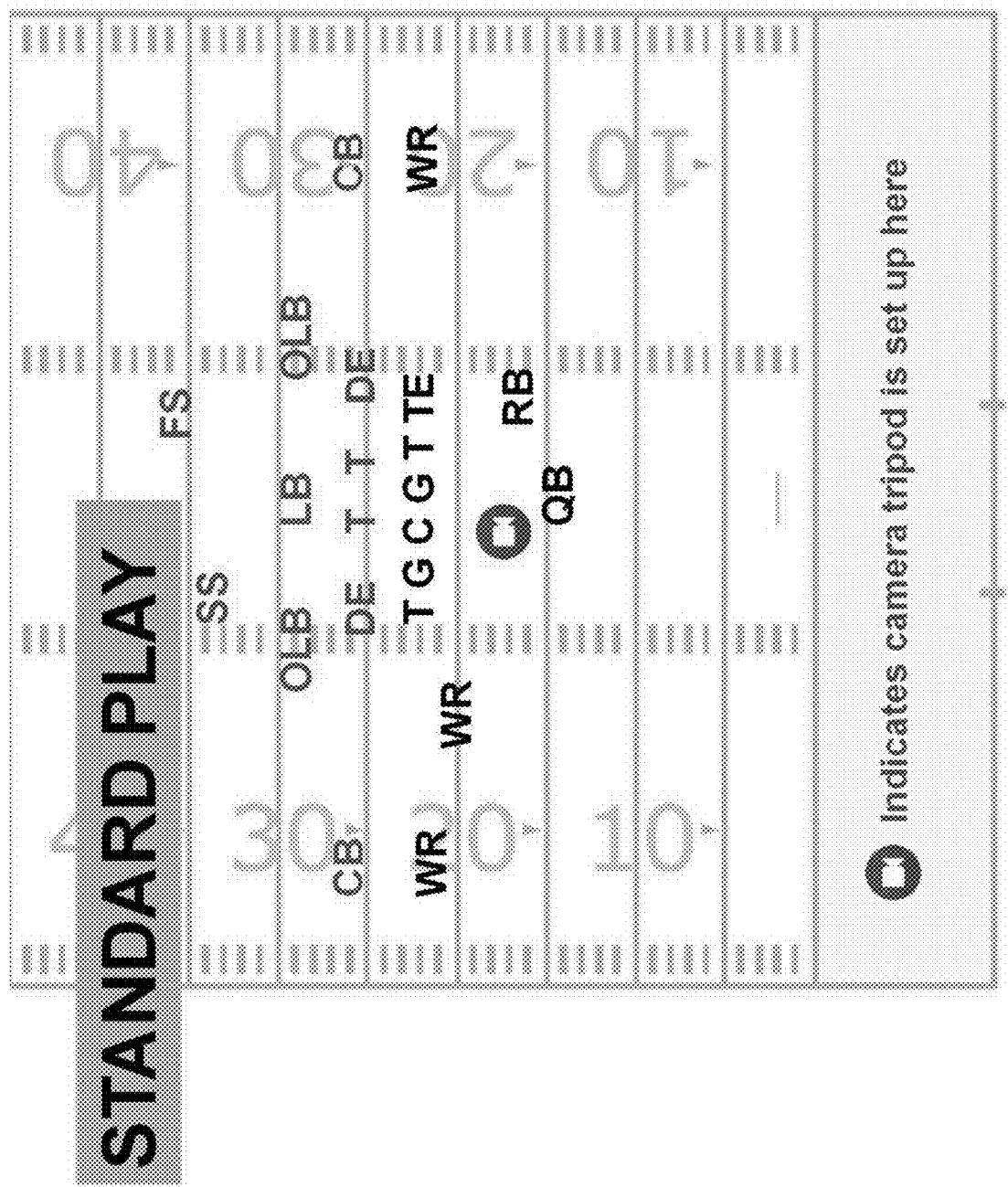
FIG. 3A illustrates an example of a standard football play with a camera rig position for a quarterback with an offset.
Figure 3B:
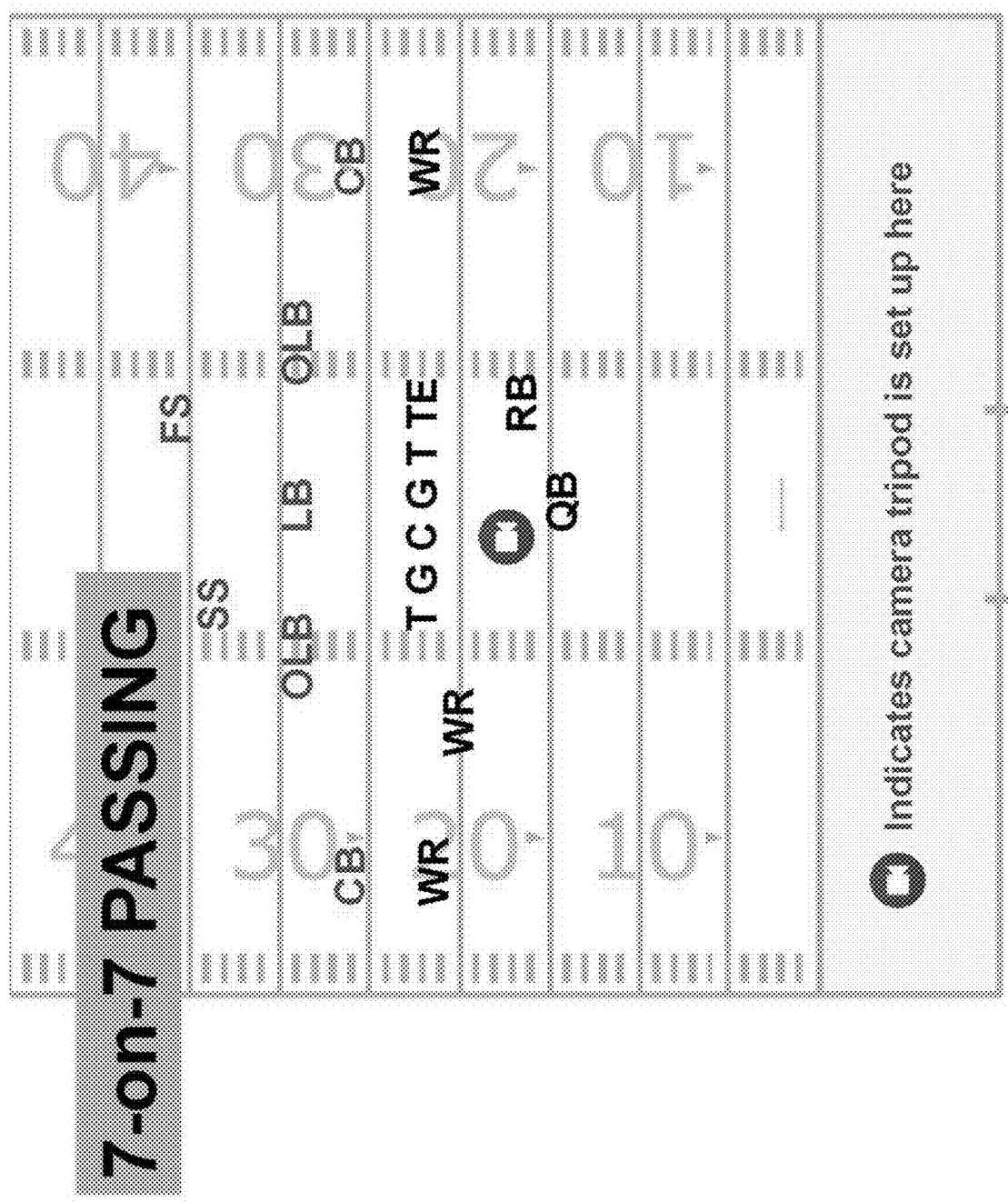
FIG. 3B illustrates an example of a 7-on-7 football play with a camera rig position for a quarterback with an offset.

FIG. 3A illustrates an example of a standard football play with a camera rig position for a quarterback (QB) with an offset. FIG. 3B illustrates an example of a 7-on-7 football play with a camera rig position for a quarterback with an offset. In both figures, the camera rig can be placed about 5 to 5.5 yards from the offensive center (illustrated as a black C). During a walk-through tempo drill, the QB can be immediately or well behind the camera rig, so long as the camera rig can still pick up a voice of the QB. During a live drill (e.g., standard play or a 7-on-7 drill), the camera rig can be placed just in front of the QB. In some examples, the camera rig can be offset from the QB approximately 6 inches to allow the QB to take a snap as he normally would. For a right-handed QB, the offset can be to the left. For a left-handed QB, the offset can be to the right.

Figure 3C:
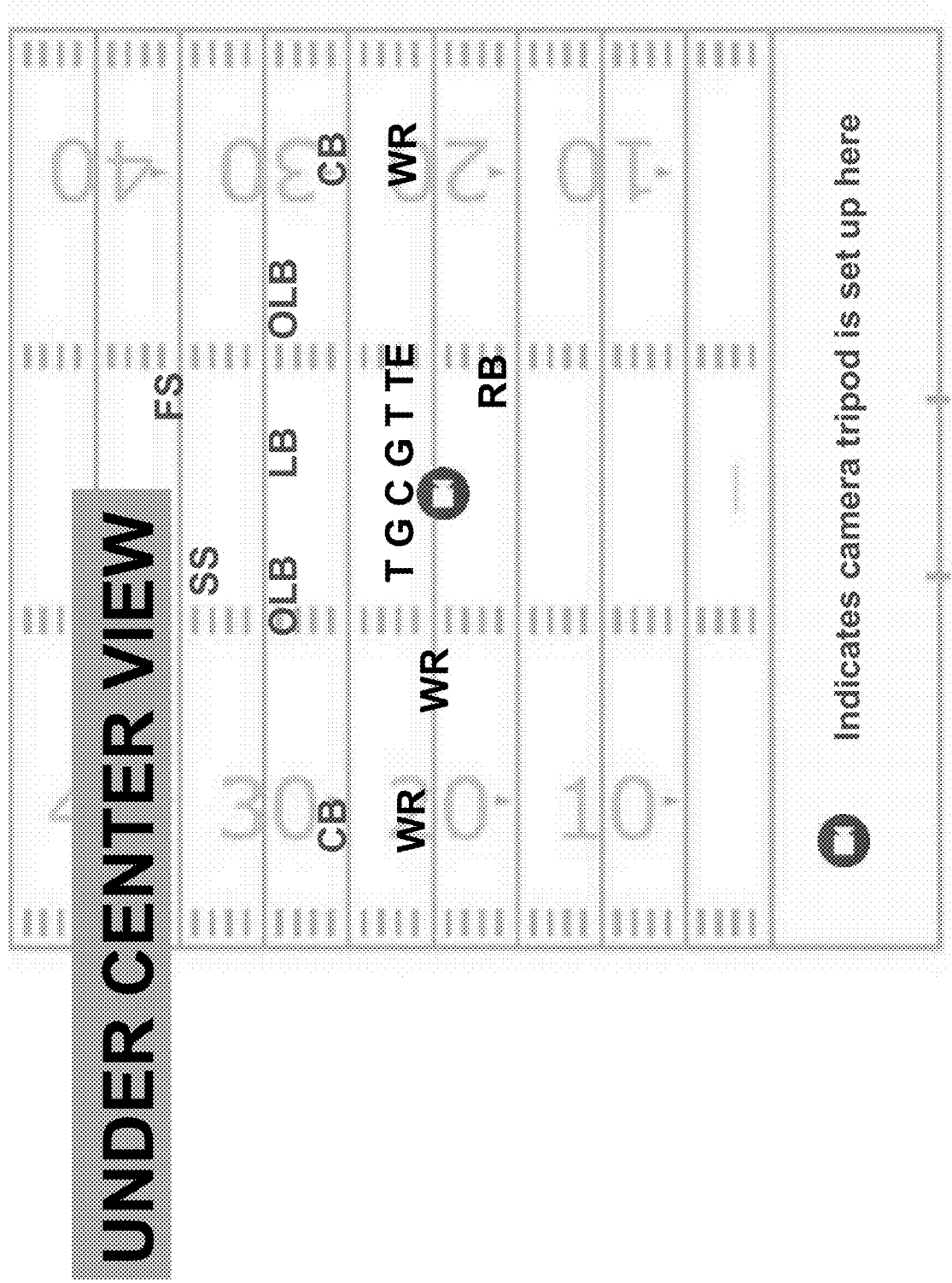
FIG. 3C illustrates an example of a 7-on-7 football play with a camera rig position in an under-center view for a quarterback.

FIG. 3C illustrates an example of a 7-on-7 football play with a camera rig position in an under-center view for a QB. When providing an under-center view, the camera rig can be located where the QB would stand as if he were taking a snap. In some implementations, the under-center view can include the camera rig behind the offensive center. In such implementations, the QB can be behind the camera rig while recording.

Figure 3D:
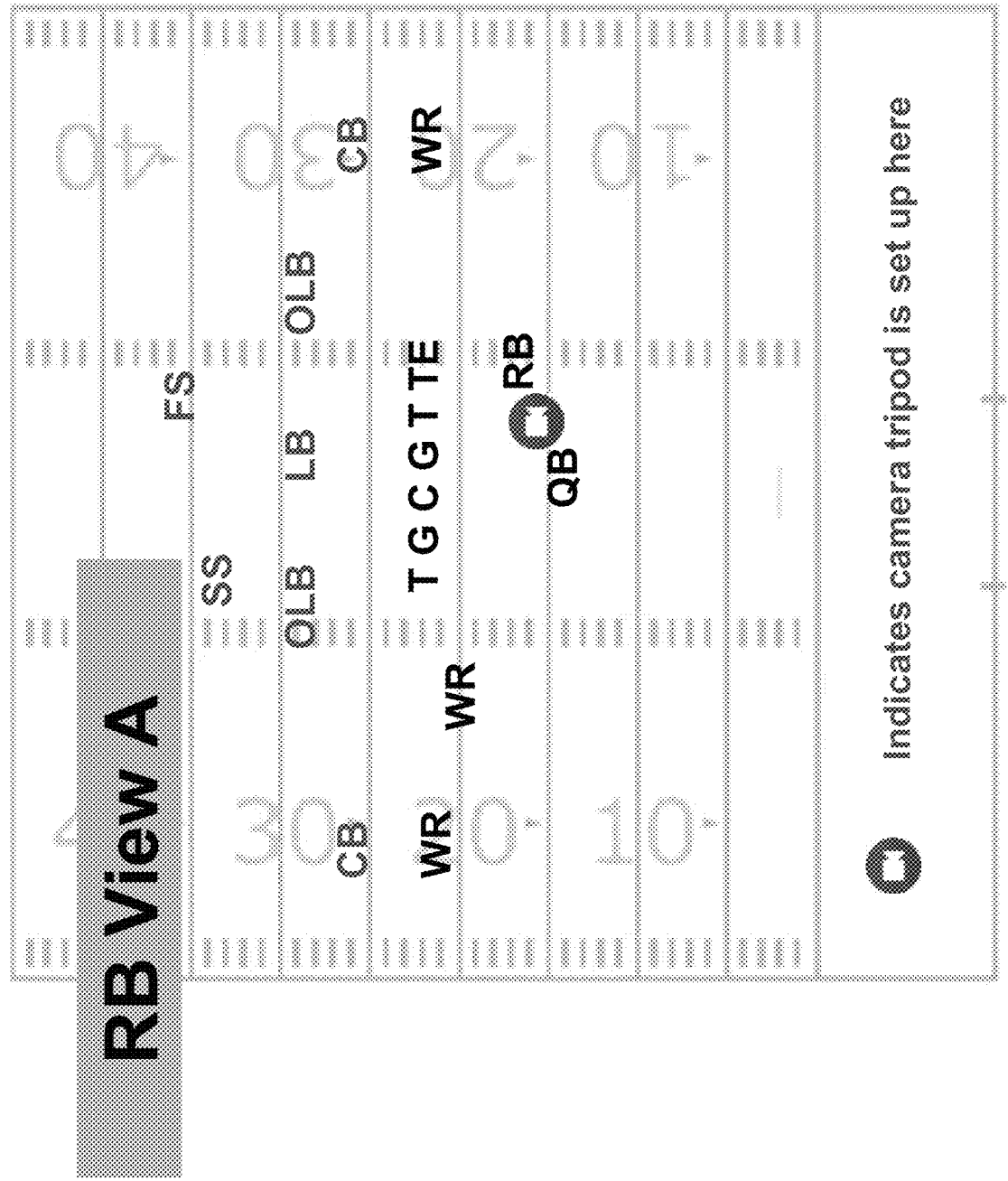
FIG. 3D illustrates an example of a 7-on-7 football play with a camera rig position for a running back.

FIG. 3D illustrates an example of a 7-on-7 football play with a camera rig position for a running back (RB). In some examples, the QB views discussed above can be used for the RB. In other examples, the camera rig can be between the QB and the RB to try to give the RB a slightly better perspective when he is experiencing playback in VR. In other instances, the camera rig can be put directly in front of the RB during a drill, which when playback occurs in VR provides the RB with the exact view he would have as if he were on the field.

Figure 3E:
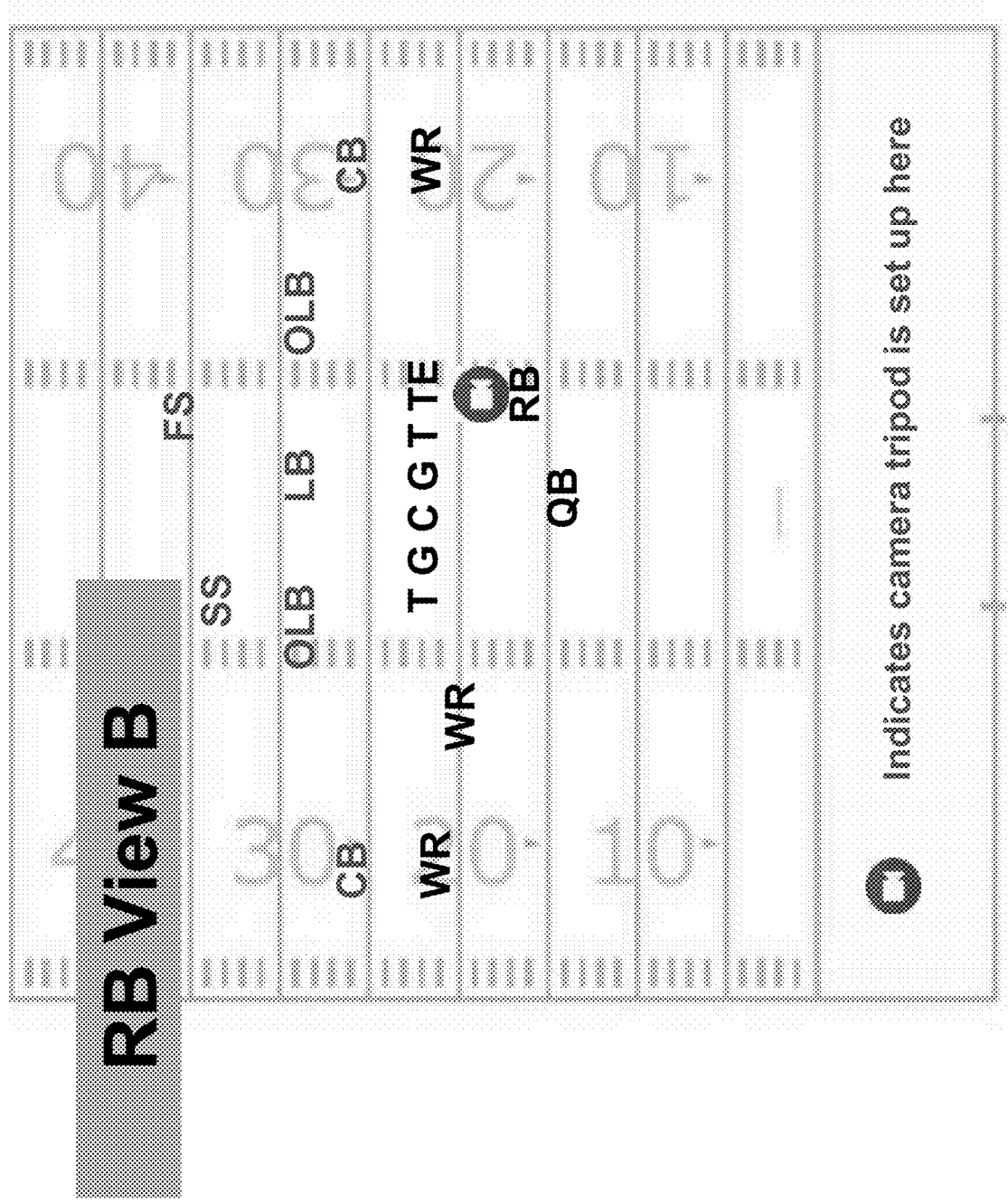
FIG. 3E illustrates another example of a 7-on-7 football play with a camera rig position for a running back.

FIG. 3E illustrates another example of a 7-on-7 football play with a camera rig position for a running back. In such examples, the camera rig can be located in front of the RB to show what the RB sees prior to and during the play.

Figure 3F:
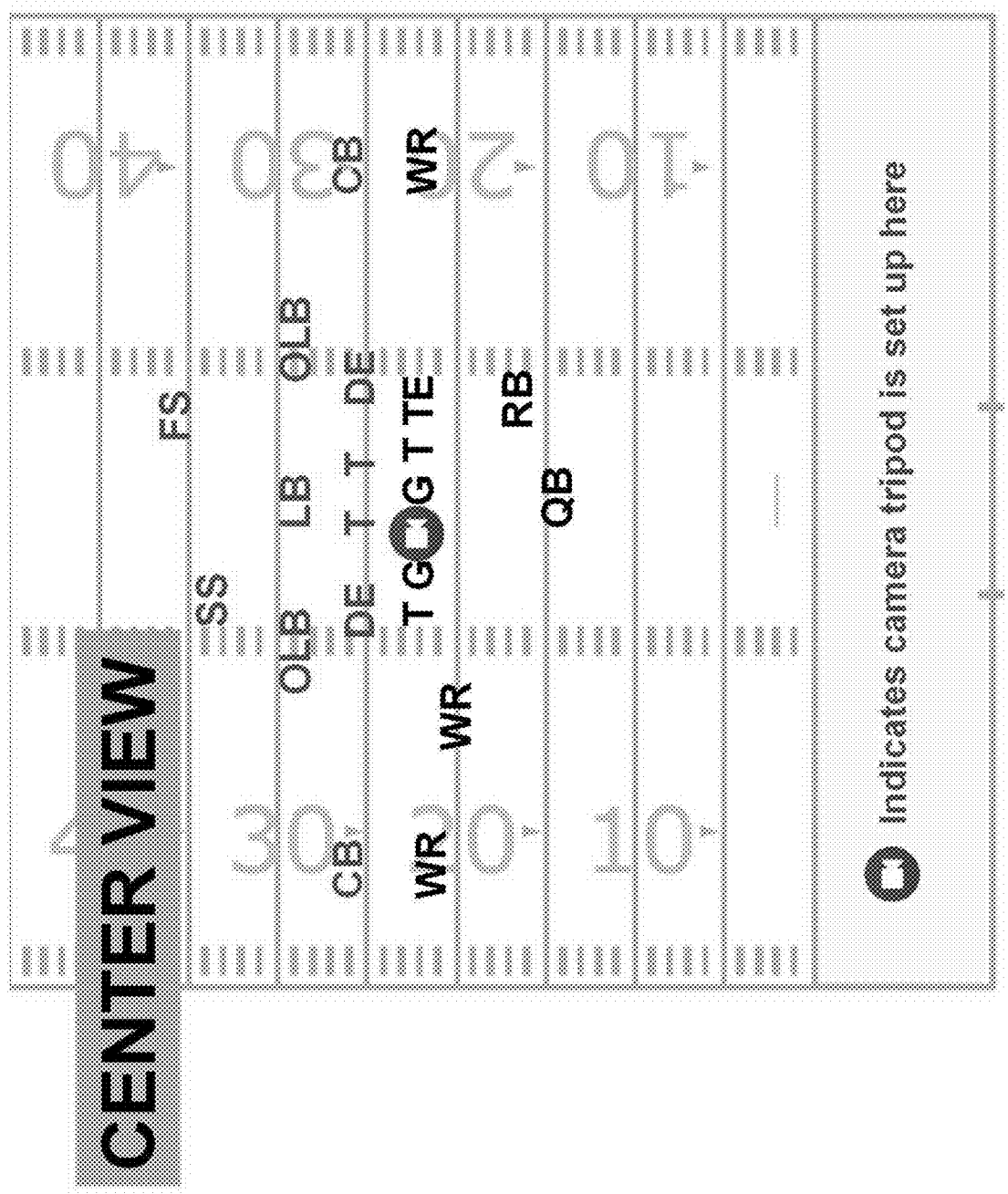
FIG. 3F illustrates an example of a standard football play with a camera rig position for an offensive center.

FIG. 3F illustrates an example of a standard football play with a camera rig position for an offensive center. In such examples, the camera rig can be lowered to a height just above the center's eye-level when he is down in his stance holding the ball (e.g., 2'5"). The camera rig can be placed in a location where the center would be, with a ball underneath the light stand to make the center feel as if he is about to snap a football when watching playback in VR.

For an offensive lineman, the camera rig can be placed where the offensive lineman would stand during a pass set, similar to the offensive center. The height of the camera rig can be set to a height of the player's eyes when he is engaged with his opponent (usually not quite as tall as the player would be if he were standing up) (e.g., 6'). Once the camera rig is set, a defensive player can rush the camera rig and make a move as if the camera rig were a human. In this way, when the end-user watches playback in VR, it is as if he is getting pass-rushed by the defender.

Figure 3G:
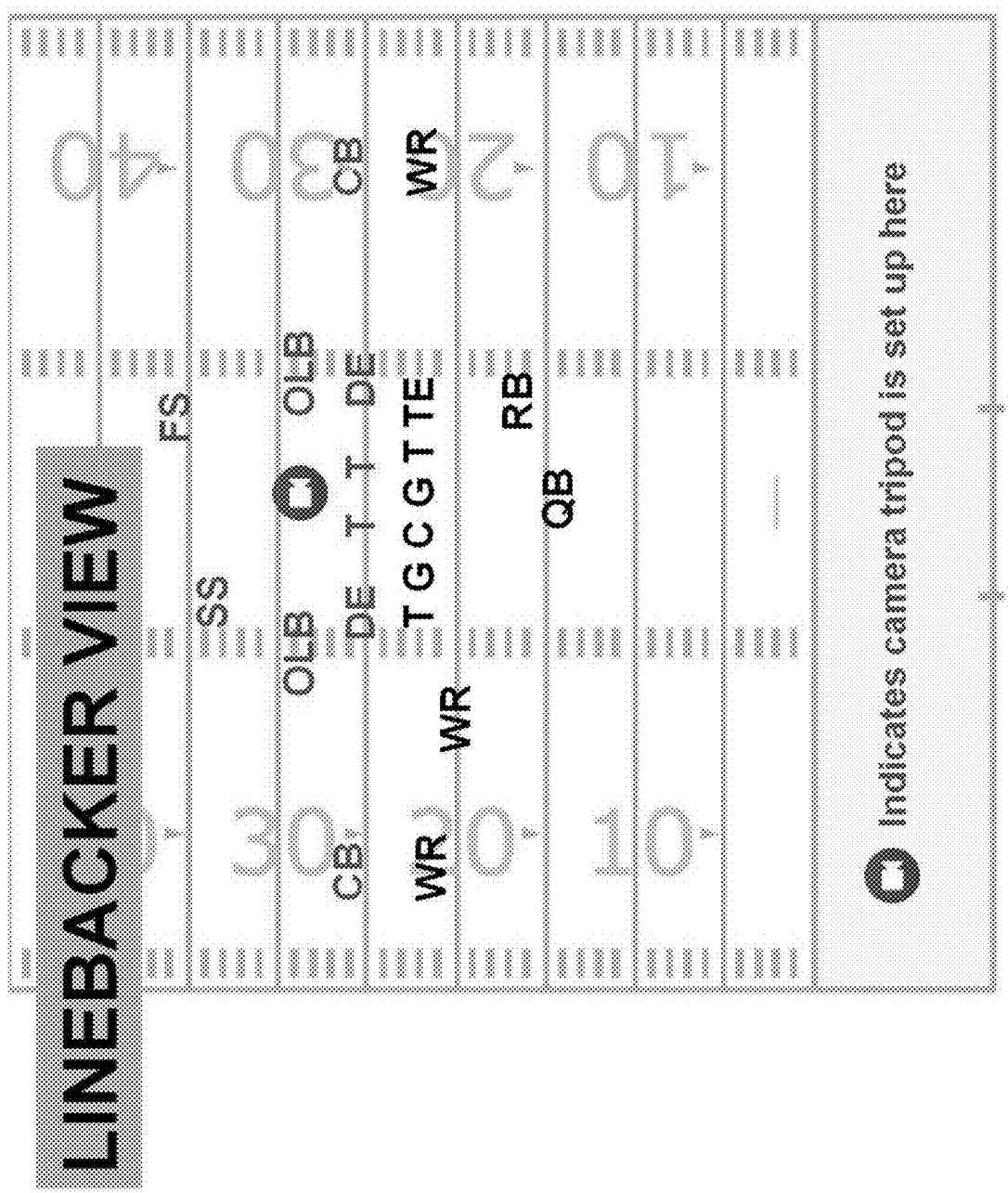
FIG. 3G illustrates an example of a standard football play with a camera rig position for a linebacker.
Figure 3H:
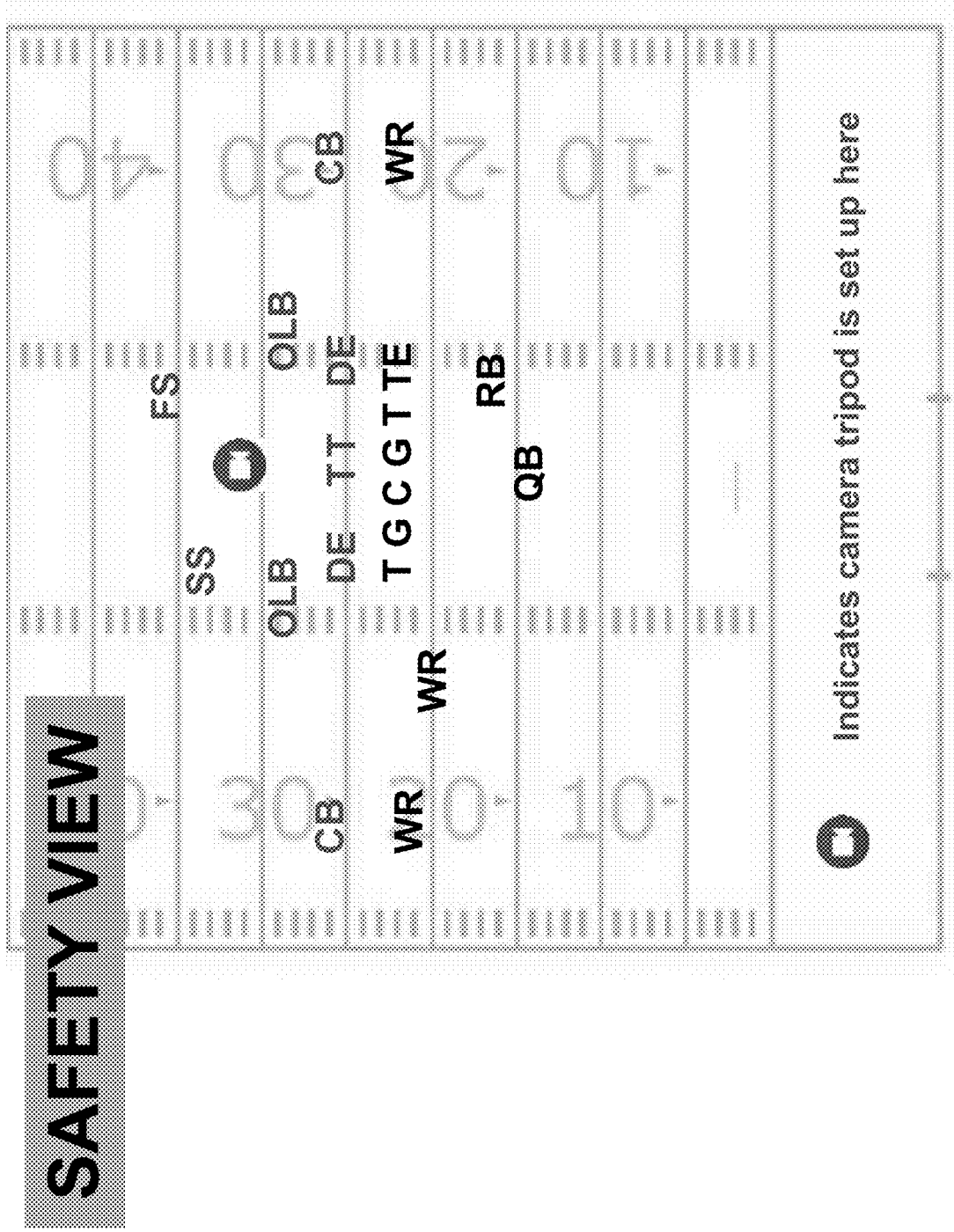
FIG. 3H illustrates an example of a standard football play with a camera rig position for a safety.

FIG. 3G illustrates an example of a standard football play with a camera rig position for a linebacker (LB). In such examples, the camera rig can be located about 6 yards off the line of scrimmage. The lateral positioning of the camera rig can depend on where the LB is in his initial alignment prior to the snap of the ball. In some cases, the camera rig can be located in front of or directly behind the LB, depending on a type of drill being run. For example, during a drill where the LB is going downhill (i.e. not dropping back into pass coverage but rather moving forward to the line of scrimmage) the camera rig can be positioned directly behind the LB. For another example, during walk-through periods which are slower pace, the rig can be positioned directly in front of the LB to capture a true first-person vantage point and he can move around it FIG. 3H illustrates an example of a standard football play with a camera rig position for a safety. In such examples, the camera rig can be located about 9-12.5 yards off the ball. The further back the camera rig, the better the field of view for the player when watching playback in VR. When content is captured on the field, the safety can stand behind the camera rig so that the camera rig picks up his voice and so, similar to the QB, the player is not in view of the camera rig when the end user watches playback in VR. In some cases, the camera can be located behind the safety, if necessary for a play.

For a defensive back (DB), the camera position can be similar to the offensive lineman, except the height of the light stand can be set to that of the DB's eye-level when he is down in a stance across from a wide receiver (e.g., 3'5"). The receiver can then "beat" the camera rig off the line, as if the camera rig were a real person. In some cases, the location of the camera rig can be varied relative to a receiver to simulate the pre-snap position of the DB. For example, in zone coverage, the DB can start anywhere from 5 to 10 yards away from the receiver.

In some embodiments, the camera rig is not placed exactly where the player would be positioned, as then the player could not be at that position during the play (i.e., an action interval). It is desirable to have the play appear realistic, and thus to have the player positioned near where the player should be. Thus, there is a tension of the player in the video to be positioned at a correct spot and the camera rig to be positioned at the same spot. But, both the player and the camera rig cannot be positioned at the same spot, or else the player would trip or hit the camera rig. Embodiments can identify the position that the player is to be at, and then have the camera rig and the actual position of the player equidistant from the ideal position. Thus, the ideal position is the median (or halfway point) between the player and the camera rig.

Figure 3I:
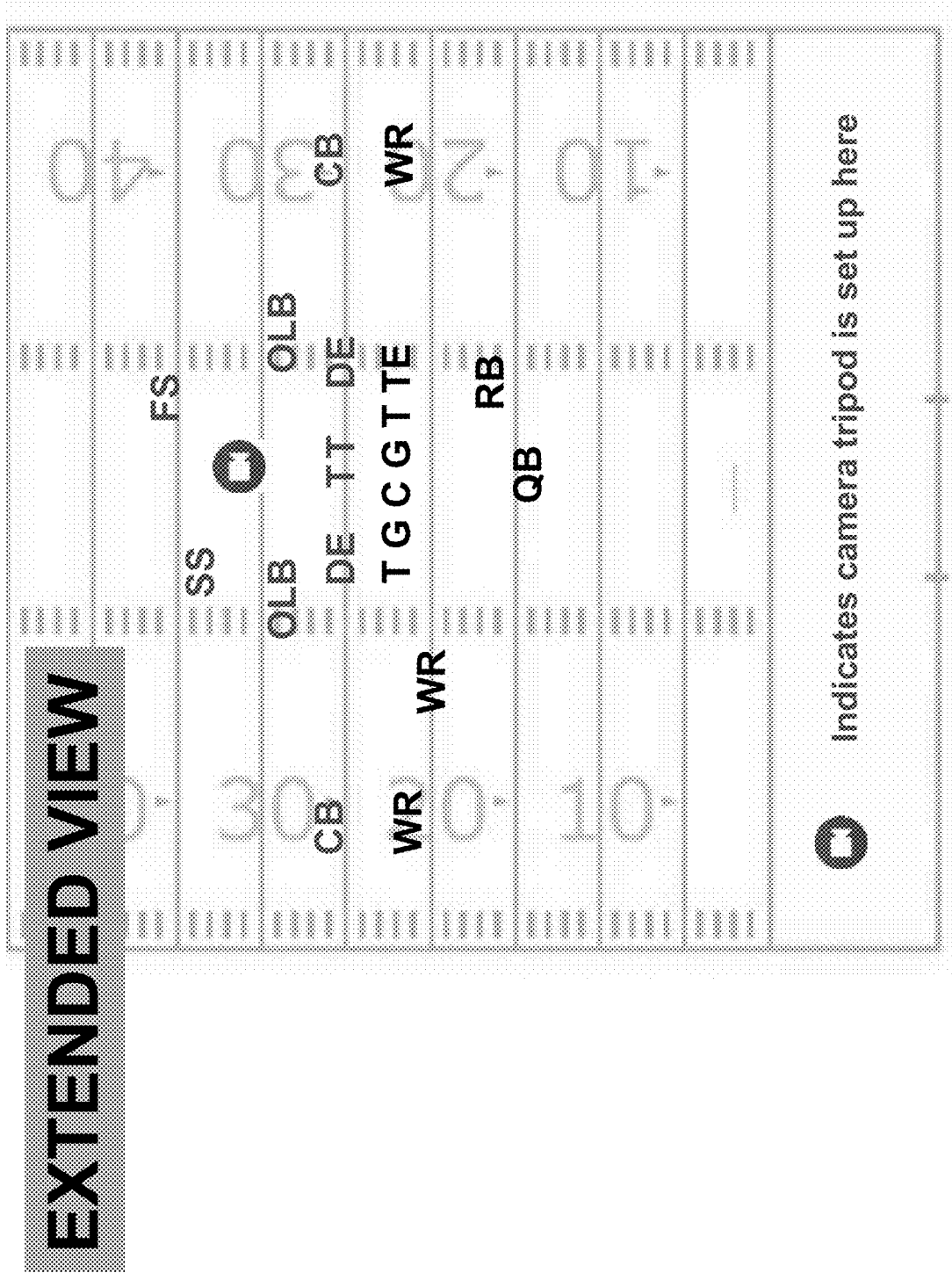
FIG. 3I illustrates an example of a standard football play with a camera rig position for extended view.

FIG. 3I illustrates an example of a standard football play with a camera rig position for extended view. In some examples, the extended view rig can be placed in a center of a field, approximately 8 to 15 yards behind an offensive center.

Generally, the camera rig should be placed far enough behind the line of scrimmage so as not to interfere with an execution of a play by the football players. Whether the camera rig is placed directly behind the center, or the DB, or any other place on the field should be based on the intention of the camera operator and the viewpoint desired for capture.

C. Recording

Once all the cameras of a camera rig are turned on using a remote (either wired or wireless), embodiments can have the option to choose several different recording methods. In some examples, output of the cameras can be cut after every play (approx. 20-30 seconds), or the cameras can run for several minutes and capture multiple plays in one take. While the end-result is not much different when stitching the plays (they will stitch the same no matter how short or long the play length), the longer plays can include much more "dead time" in the recording (where the play is not being run) and thus the file sizes can be much larger. The decision as to whether or not to film individual plays or multiple plays in one "take" can depend on the tempo of the offense or defense between plays. Some teams may not huddle between plays, for example, so it may be wiser for such teams to film multiple plays in one take; conversely, for the teams that do huddle, it can make sense to stop and start the cameras between plays.

Once recording begins, each camera take can be synchronized with a loud audio cue, such as a clap or dog-clicker device. The clap can be used as an audio spike that is used to mark when to begin stitching. Thus, the raw footage can be stitched together into finished plays with the presence of an audio spike that tells us when to begin stitching and to adjust the frames of the cameras so all are synchronized together.

Another factor to consider is that teams often move the ball around between plays. To this end, the person manning the camera can be ready at all times to move the camera rig seamlessly if/when necessary.

Specific lighting conditions can be critical for successful scene capture. For example, whichever side of the ball we are filming can be back-lit. So, if we are filming for offense, the sun should be shining on the defense, and vice versa. Side lighting does not significantly affect the display and cloudy days produce good content. Night time with lights above often produce the best quality videos.

III. Processing of Video to Create VR Models for Plays

Regarding workflow, asset management in the pipeline from camera offloading to final stitched videos can be laborious. Embodiments can use a streamlined process. In some embodiments, after recording footage, the memory cards can be removed from the cameras of the camera rig, and then placed in a memory card hub (e.g., a 6-card Lexmark Card Hub). A user can run a script (e.g., a custom Python script) that offloads all of the camera files, organizes them into correct file hierarchies, and then error checks them for completeness. This can be done either on a laptop or a desktop that is configured for a user. Once footage is offloaded, the user can run code (e.g., in C++) that zips, encrypts, and uploads the footage to a cloud service server. Once the footage is uploaded and confirmed, all memory cards can be cleared and local footage can be destroyed for privacy and storage space concerns.

Regarding a stitching process, embodiments can use a combination of Kolor Video Pro and Videostitch (two commercial programs) to perform the panoramic stitching by hand. A series of settings that work optimally for export include: cubic smoothing, exposure and contrast leveling, and control point optimization. The chosen export format can be encoded in H.264 MP4's at a 1080P 60 fps resolution. This has a 10 MB/s bitrate, allowing smooth playback in VR without any stutter. Other embodiments can scale this up to 24 MB/s 4K when display and software technology can support it without stutter in a VR headset.

In some embodiments, the stitching process can be performed automatically, as is described in Application No. 62/274,033 filed Dec. 31, 2015 and entitled "Transforming Video Components Allocated To Action Intervals Into Virtual Reality Models." This applications is hereby incorporated by reference in its entirety for all purposes.

IV. Enhancement Models

A. Weatherizer

In various embodiments, a computer system can add at least one or more of snow, rain, wind, blinding sunlight, fog, or any combination thereof by adding 3D enhancement models into the video sphere. The individual 3D models (e.g., raindrops, snow, objects blown by wind, and fog layers) can be created. Embodiments can then determine a proper frequency and speed of each of the objects (e.g., how many raindrops fall within a given location and at what speed).

The size of the objects can be critical. For example, a snowflake as a 3D model can look very different when viewed inside a video sphere. The size of the 3D models can be scaled accordingly. Accumulation of snow can be particularly tricky given the other players are not 3D models but instead are video layers. The computer system can add additional layers of video based on the amount of snow accumulation to mimic the environment one would find on the field during a snowstorm.

For blinding sunlight (or glare), a balance of editing layers on the spherical video with adding 3D model lighting effects within the sphere can be used. Simulating direct sunlight/dome lights to make the ball disappear due to contrast can be particularly helpful for training. Certain enhancement models can be baked onto the videos themselves. In some examples, an image or a video can include metadata that indicates a direction of a sun in the image or the video. In other examples, the computer system can determine a location to insert a glare. In such examples, the computer system can either automatically determine, using a pseudo random generator, where the glare should be inserted or a user can indicate where to put the glare. In examples where the user indicates where to put the glare, the user can either indicate a position of the glare or a time of day. By indicating the time of day, the computer system can determine where the sun would be at that time of day.

A glare can be inserted into the image or the video such that a portion of the image or the video appears to include a glare. The glare can simulate when a player cannot see as well in a particular portion because of the sun. The glare can be inserted by applying a mask that lightens the portion that includes the glare and gradually lightens less surrounding areas until a point that the mask is no longer lightening. In some examples, the glare can reduce over time to simulate a user getting used to the sun.

In various embodiments, different features of weather can be selected individually or in combination with each other. The video content of the additional weather can be premade video files that are layered over the spherical video obtained from the camera rig, or such weather content can be simulated to create the layers at the time of playing. In some embodiments, the actual position of a particular object (e.g., the sun) can be covered by sky to provide a simulated sun at a particular location in the sky.

B. Decision Making Under Duress

Embodiments can use a specific library that simulates crowd noise, in terms of positive (e.g., clapping) and negative (e.g., booing) feedback. A system can deliver multiple channels of audio information, with each layer emanating from various spatialized nodes that allow for a realistic simulation of a distracting crowd. Other types of distress can be used besides audio from a crowd, such as noise from other players.

C. Visual Flash

A visual flash can train football players to learn how to make proper decisions under stressful scenes with limited information. The "normal" mode of the system can show an entire play duration and teach the player, and then later test him, on what to do during the entire play. But during an actual game, there are many unexpected events that limit the player's ability to encode the entire visual scene. For example, a defensive player might blitz and take over most of the quarterback's field of view so that he cannot see the play unfold. One limitation of capturing spherical video (as opposed to creating 3D models of every player and object on the field) is that the video cannot be changed interactively, for example a player cannot be selected and made to blitz. However, "degraded" fields of view can be created to train under limited visual information.

In various embodiments, a system can reduce visual information during training in two separate ways, both on layers of the spherical video themselves (as opposed to adding 3D objects).

The first is "flash," which only shows small temporal "chunks" of the action. For example, one schedule can show 300 millisecond windows of the scene followed by 500 millisecond black periods (in which the player does not get to see the action on the field), and then repeat this pattern such that the next 300 millisecond period is the action that would have occurred at that time in the sequence. The flash can force decision making with very little visual information.

The second is "patch," where a "checkerboard" pattern can be created in which the player has his vision occluded by dark splotches in the scene. Moreover, the pattern of splotches can change over time. For example, the patterns can shift randomly, every 800 milliseconds. In addition, the dark splotches may not be random information, but instead are roughly silhouettes of football players.

D. Obstacle Course

Within the sphere, we can add 3D objects that pop up (these can be simple squares, circles, etc.) to provide distractions. The location of the 3D objects can be varied on X, Y, and Z, as well as the size and aspect ratio. The 3D objects can be placed strategically to block portions of the player's (e.g., QB) field of view, to move in manners that defensive players might view, or just to make the decision task harder. The idea is to simulate the chaos of football in a way that is challenging.

V. Display and Playback

The final videos can be imported into a spherical video playback application. The spherical video playback application can be built using a rendering engine (e.g., Worldviz Vizard engine (a Python-based OpenGL wrapper) or Unity (a game development software)). The videos can be organized into folders based on relevancy to the team (offense, defense, special teams, etc. and sub-categories within those that further organize plays according to the period during which they were shot in practice and/or locations on the field). A variety of companies have head-mounted displays that can be used on embodiments herein, including Oculus (e.g., Rift with a version of Development Kit 2 or the consumer version), Samsung (e.g., Gear VR), Sony (e.g., Playstation VR), and HTC (e.g., Vive). A user can load the desired videos, which can be appended into a video array, where the user is able to skip forward, back, pause and replay as desired.

In the engine, the equi-rectangular videos can be wrapped around a geometric sphere object, appearing undistorted and natural to the user. Additionally, metadata of the play (play name or any other relevant notes) can be displayed on a text overlay that can be shown or hidden as desired. On exit, all data about the user's head motions (recorded from an orientation tracking sensor in the display device) can be captured from the user during the session and exported into a text file. This text file can be analyzed by coaches later to statistically examine progression of athlete head movement, such as missing key play moments.

A. Coach's Ride Along

In some embodiments, there can be two head-mounted displays. For example, the pitch/yaw/roll data of a player can be provided to a head-mounted display used by a coach. Thus, the tracking data from the player can be sent to a network computer, which can render the same scene simultaneously for the coach. This can increase player/coach connection and understanding of plays.

A problem with this approach is that the coach can get dizzy as the coach has to experience the scene with a disconnect between his own head movements and the visual scene that is controlled by the player. In order to reduce this "Simulator Sickness," embodiments can simultaneously vary the field of view (FOV), the flash, and the opacity of the scene.

For the FOV, the window size that the coach sees can be decreased in size. Thus, a scaled-down version of the scene can be displayed, surrounded by black space. In this manner, embodiments can reduce the "control" aspect of the visual scene, but keep the substantive information. Thus, the coach can see what the player is exactly seeing, but not feel as if he is in the scene.

For the flash, similar to the training module, the coach can see action for 300 milliseconds surrounded by 500 millisecond black "rest" periods.

For opacity, embodiments can dial down how solid the colors are, so as to reduce the coach's visual experience.

In various embodiments, a user can modify any of these three parameters to provide individualized comfort. Each of the parameters can be modified separately.

B. Invisible Hand

This feature is similar to the ride along in that the coach can be networked to the player and experience a visual scene based on the player's head movements within a head-mounted display. In such examples, the coach can guide the visual experience of the player.

In some embodiments, the coach can adjust a percentage that indicates an amount the player's visual scene is from the player and from the coach. In such embodiments, the pitch, yaw, and roll data from both the coach and the player can be combined. Likely the most used percentages will be 100/0 and 0/100, that is, all the information from either the coach or the player; however, the 80/20 blend, in which the player receives small nudges from the coach, can be particularly helpful for newer players and backup players. The blending can be done in a number of ways, for example computing an average vector between both the coach and the player. Another option is ghosting, where a player can see two versions of the scene: a current normal one and then a more transparent one of where the coach thinks the user should be looking. By setting two different transparencies (or alpha levels), a user can be nudged in the right direction without becoming sick.

C. Spatial Tagging

Typically with game film, coaches can view the film and tag specific points in time by marking the plays, for example "third down" or "blitz". In some embodiments, one can also tag location. In other words, knowing the tag is not sufficient to direct the viewer's head to the right location. Coaches can drop markers in the sphere to alert the player to attend to particular areas. Embodiments can alert the players to the markers either by having an array of flowing arrows or spatialized sound.

D. Selection of Plays and Playlists

As the video library grows, it can become harder to navigate the interface within a VR model itself, e.g., using a head-mounted display. A user might not want to sort through hundreds and hundreds of videos all in one folder. In some embodiments, a user can select a play by a play name (e.g., via voice commands) that is commonly used among the players, position on the field, formation, offense v. defense, etc.

Some embodiments can allow a user to specify attributes for organizing plays into a playlist. For example, a user can specify a position (an example of an attribute), and a playlist can be generated for that position. Another attribute is a formation. Another example is a name of a player, as the player may be associated with particular plays.

The plays that are selected by user can be tracked for generating future playlists. Each user can have a profile. Selections by a user can be used to create a playlist for that user, and can be used to create playlists for other users that have a similar profile, e.g., user who plays the same position. Some users may also be able to share their playlist to others depending on name or profile. For example, a coach may want to create a playlist and share with a specific player or several players in a position group. A suggested playlist can include plays that a user has not practiced yet. The plays that a user has practiced can be tracked so as to determine ones that the user has not practiced yet.

E. Translational Movement

Conventionally, a virtual reality (VR) model is not affected by translational movement along a surface by a user during a VR experience. Instead, the VR model only allows rotational movement in a sphere. For example, when the user moves forward or backward, the VR model treats the movement as not affecting the VR model. In some examples, where the VR model is based on spherical video from a stationary camera rig, as embodiments herein describe, the viewpoint of the stationary camera rig can be the view presented by the VR model. However, embodiments herein can allow objects in the VR model to move based on the translation of the user, e.g., objects will get closer to a user as the user walks toward the objects.

Figure 4A:
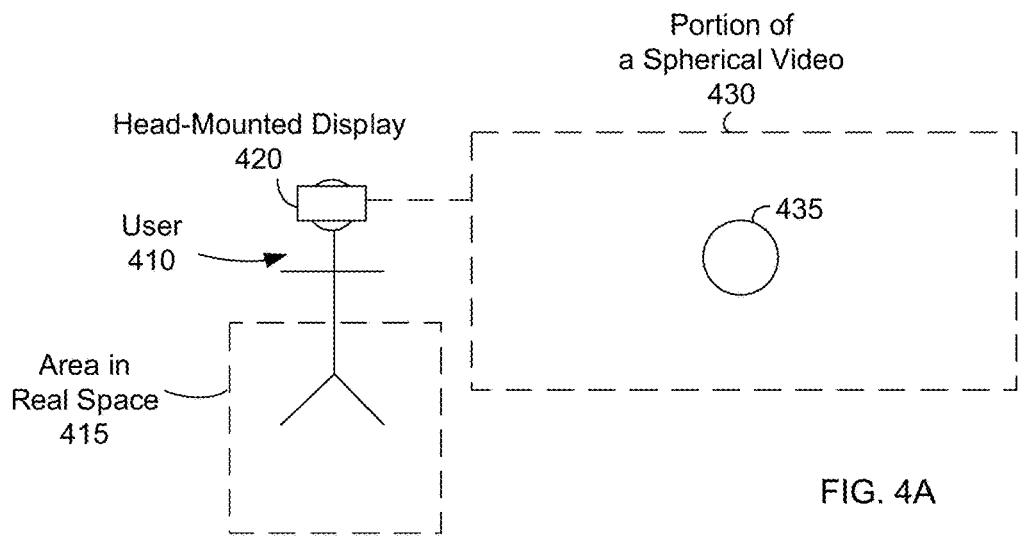
FIG. 4A illustrates an example of a system that allows translational movement of a user to affect a view of the user.

FIG. 4A illustrates an example of a system that allows translational movement of a user 410 to affect a view of the user 410. In the example, the user 410 can be viewing a portion of a spherical video 430 using a head-mounted display 420. The portion of the spherical video 430 can be determined from a VR model based on an orientation of the head-mounted display 420. The portion of the spherical video 430 can include an object 435.

In some embodiments, translational movement in an area in real space 415 of the head-mounted display 420 can be tracked using a tracking system 425. Based on the translational movement, the VR model can zoom into a portion of spherical video that the user 410 is moving toward. Such zooming can allow objects (e.g., the object 435) that the user 410 is moving toward to get closer to the user.

The amount of zoom can be proportional to the amount of distance that the user 410 has moved in the area in real space 415. For example, if the user 410 (i.e., the head-mounted display 420) moves two feet from a starting position (e.g., taken as the position of the camera rig), that distance can be determined to correspond to a particular amount of zoom (e.g., 1.3×). The translation distance and amount of zoom can be related by any monotonically increasing function. Thus, the proportionality may be linear or non-linear. However, such zooming does not change the spatial relationships among the objects in the spherical video.

Figure 4B:
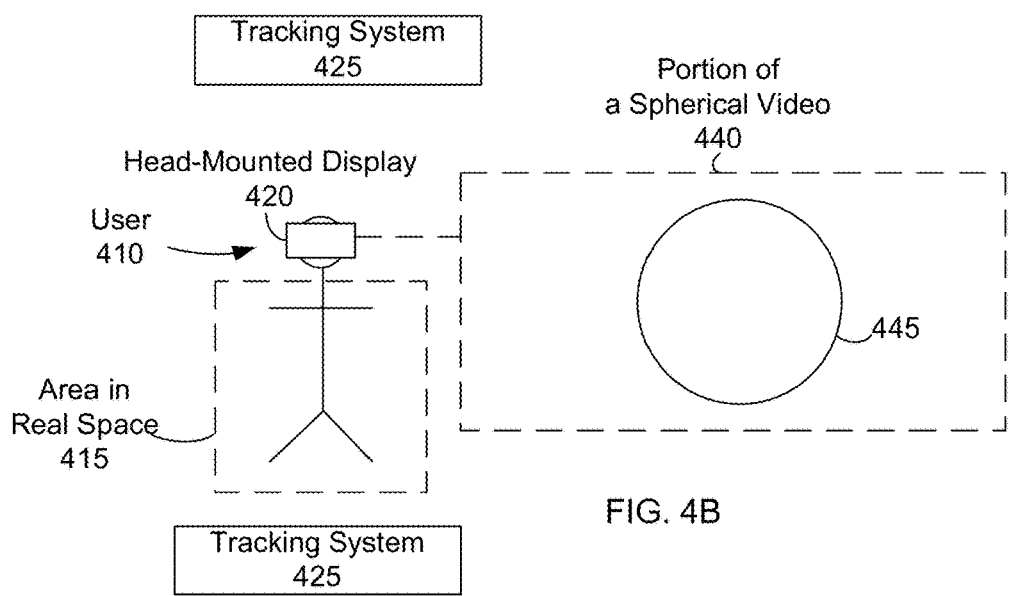
FIG. 4B illustrates an example of forward translational movement of a user affecting a view of the user.

FIG. 4B illustrates an example of forward translational movement of the user 410 affecting the view of the user 410. In the example, the tracking system 425 can detect movement of the user 410 in the area in real space 415. For example, the tracking system 425 can detect that the user 410 moved toward the tracking system 425, and in doing so moved toward the object 435. A computer system implementing the VR model can determine to zoom in to a portion of the spherical video 440. By zooming in to the portion of the spherical video 440, the object 435 can appear closer to the user 410. The portion of the spherical video 440 can include an object 445, which is a larger version of the object 435.

Figure 4C:
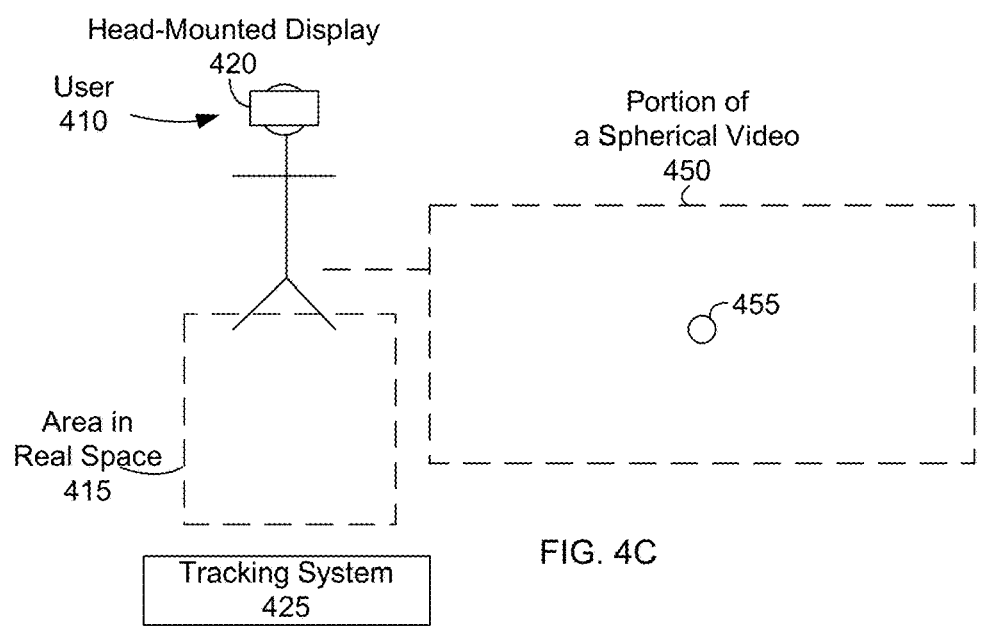
FIG. 4C illustrates an example of backward translational movement of a user affecting a view of the user.

FIG. 4C illustrates an example of backward translational movement of the user 410 affecting the view of the user 410. In the example, the tracking system 425 can detect movement of the user 410 in the area in real space 415. For example, the tracking system 425 can detect that the user 410 moved away from the tracking system 425, and in doing so moved away from the object 435. A computer system implementing the VR model can determine to zoom out to a portion of the spherical video 450. By zooming out to the portion of the spherical video 450, the object 435 can appear farther from the user 410. The portion of the spherical video 450 can include an object 455, which is a smaller version of the object 435.

Figure 5A:
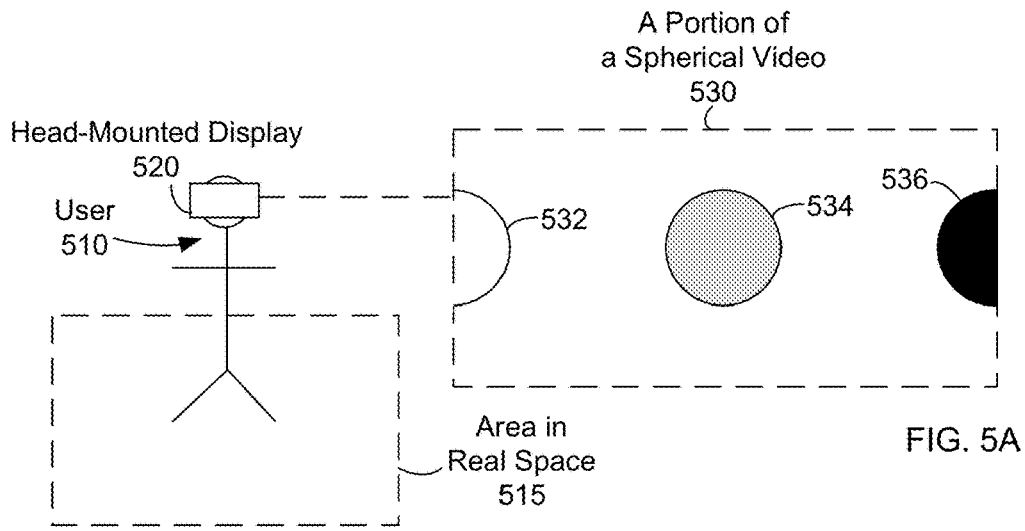
FIG. 5A illustrates another example of a system that allows translational movement of a user to affect a view of the user.

FIG. 5A illustrates another example of a system that allows translational movement of a user 510 to affect a view of the user 510. In the example, the user 510 can be viewing a portion of a spherical video 530 using a head-mounted display 520. The portion of the spherical video 530 can be determined from a VR model based on an orientation of the head-mounted display 520. The portion of the spherical video 530 can include a first object 532, a second object 534, and a third object 536.

In some embodiments, translational movement in an area in real space 515 of the head-mounted display 520 can be tracked using a tracking system 525. Based on the translational movement, the VR model can change a portion of spherical video that the user 510 can see using the head-mounted display 520. Such change can allow objects (e.g., the first object 532) that the user 510 is moving toward to move into view while other objects (e.g., the third object 546) to move out of view.

In some embodiments, the amount of zoom might not change when translationally moving left and/or right. The portion of the spherical video 530 can be what changes. The amount that the portion of the spherical video 530 changes can be based on an amount the user 510 has moved in the area in real space 515. For example, if the user 510 (i.e., the head-mounted display 520) moves two feet from a starting position (e.g., taken as the position of the camera rig), that distance can be determined to correspond to a change of the portion of the spherical video 530 of a particular amount (e.g., 200 pixels). The translation distance and change can be related by any monotonically increasing function. Thus, the proportionality may be linear or non-linear. However, such changing does not change the spatial relationships among the objects in the spherical video.

Figure 5B:
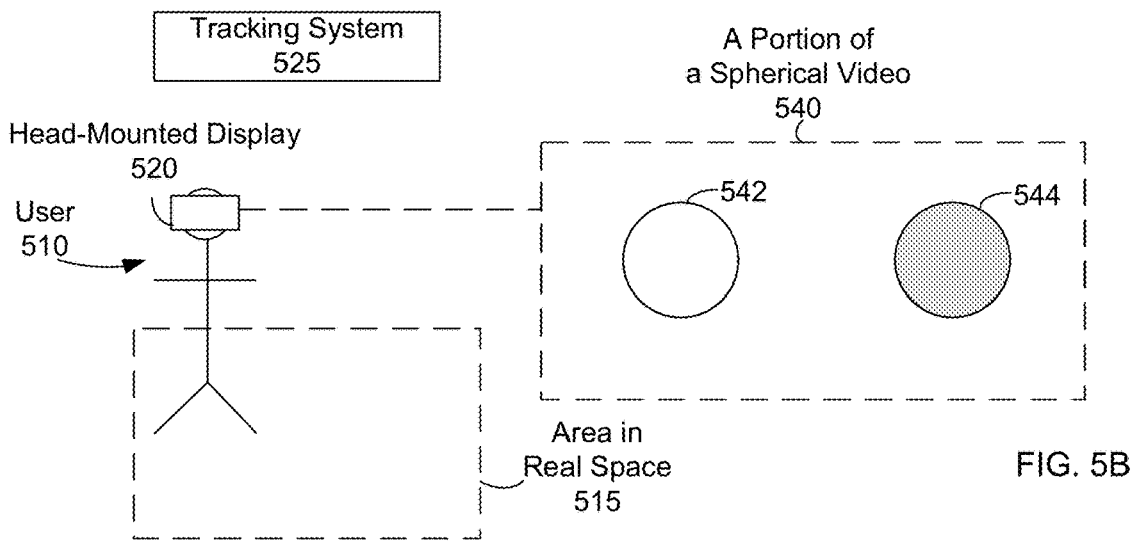
FIG. 5B illustrates an example of left translational movement of a user affecting a view of the user.

FIG. 5B illustrates an example of left translational movement of the user 510 affecting the view of the user 510. In the example, the tracking system 525 can detect movement of the user 510 in the area in real space 515. For example, the tracking system 525 can detect that the user 510 moved to the left, and in doing so moved in a direction of the first object 532. A computer system implementing the VR model can determine to change a portion of the spherical video 530 to a portion of the spherical video 540. By changing to the portion of the spherical video 540, the first object 532 can be in full view while the third object 536 disappears. The portion of the spherical video 540 can include a first object 542 and a second object 544, which correspond to the first object 532 and the second object 534 respectively.

Figure 5C:
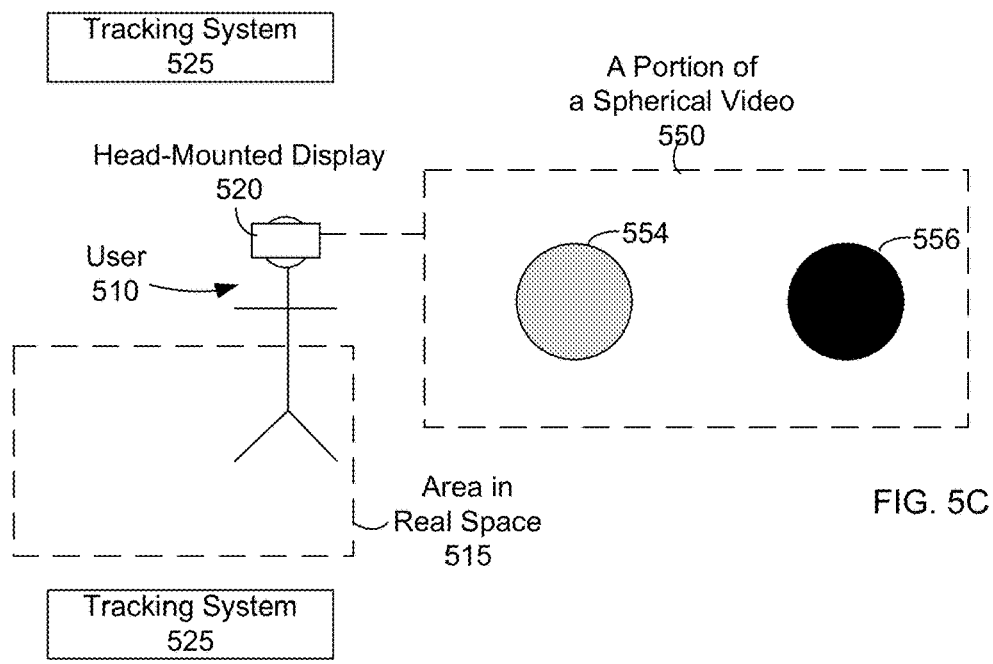
FIG. 5C illustrates an example of right translational movement of a user affecting a view of the user.

FIG. 5C illustrates an example of right translational movement of the user 510 affecting the view of the user 510. In the example, the tracking system 525 can detect movement of the user 510 in the area in real space 615. For example, the tracking system 525 can detect that the user 510 moved to the right, and in doing so moved in a direction of the third object 536. A computer system implementing the VR model can determine to change a portion of the spherical video 530 to a portion of the spherical video 550. By changing to the portion of the spherical video 550, the third object 536 can be in full view while the first object 532 disappears. The portion of the spherical video 550 can include a first object 554 and a second object 556, which correspond to the second object 534 and the third object 536 respectively.

FIG. 6 is a flowchart illustrating a method 600 for providing a virtual reality (VR) model including a spherical video. Method 600 can be used to detect translational movement and change a portion of spherical video based on the detected translational movement. One or more blocks of method 600 can be optional. In some examples, a user can wear a head-mounted display for presenting the VR model, such as a spherical image or video. Images and/or videos viewed by the user can be a portion of the spherical image or video and provided on other displays to be viewed by other users (e.g., a second screen).

At block 610, the spherical video can be stored in a memory of the computer system. The computer system can be located with or remote from the head-mounted display.

At block 620, tracking information can be received from one or more sensors on the head-mounted display. The tracking information can provide an orientation of the head-mounted display. For example, the orientation can include a direction that the head-mounted display is facing.

At block 630, a portion of the spherical video can be determined based on the tracking information. The portion of the spherical video can correspond to the direction that the user is looking inside of the head-mounted display. In some embodiments, the portion of the spherical video can change depending on a direction that the user is looking.

At block 640, the portion of the spherical video can be provided from the computer system to the head-mounted display for displaying on a display screen of the head-mounted display. The displaying of the portion of the spherical video can be provided in various ways, e.g., on a mounted screen or projection directly onto the eyes. Either embodiment involves a display screen, whether the display screen is what is projected on the eye or displayed on mounted screen, e.g., an LCD display. For example, projection devices can use a micromirror device or other device that modulates light to create an image, and such devices can be a display screen, e.g., when the image is projected directly onto the user's eye.

At block 650, a translation movement of the head-mounted display can be detected while the head-mounted display is displaying the portion of the spherical video. In some examples, a detector communicatively coupled with the computer system can detect a signal associated with a stationary device. The signal can provide a relative distance from the stationary device to the head-mounted display.

As an example, the stationary device can emit a light signal that is detected by a sensory on the head-mounted display. As another example, a light signal can be emitted from the head-mounted display and can be detected by a sensor on the stationary device. In yet other embodiments, either the stationary device or the head-mounted display can include the signal source and the sensor. Another embodiment can use an accelerometer or other internal sensor to detect motion.

At block 660, an amount of the translational movement can be determined based on the detected signal. The amount of translational movement can be determined based on changes in time differences of the signals received due to the translation of the head-mounted display. The translational movement can correspond to the user moving in real space. For example, the user can move forward/backward or left/right.

At block 670, a position of the user away from a central point of the spherical video as a result of the translational movement can be determined. The position can be measured as a physical position, e.g., in meters. In another embodiment, the position can be measured as a percentage (fraction) based on a size (e.g., diameter) of the spherical video. The size of the spherical video can depend on the focal lengths of the cameras used to create the spherical video.

At block 680, the portion of the spherical video can be zoomed in or out based on the position of the user. The zoom can correspond to the change of position of the user. The zoom can make it look to the user that a portion of the spherical video that the user is viewing is the direct result of the movement by the user In another embodiment, multiple video spheres can be shot simultaneously. That is, there can be more than one camera rig that is obtaining videos of the same action interval. The two sets of videos can each be stitched together to form two separate spherical videos. The distance between the two videos can be known. In such embodiments, motion parallax can be achieved by blending the separate spherical videos (as discussed below). For example, objects closer to the user can move more in the field of view than objects farther away.

In various implementations, the transitions can be soft or hard transitions. A hard transition can include having the spherical video change from completely the first spherical video to a second spherical video, e.g., when a user moves closer to the relative location of where the second camera rig was located. In such implementations, only one spherical video is shown at one time, and is shown with full strength.

A soft transition can have two spherical videos shown at one time, each potentially with different levels of strength (e.g., different levels of translucence/opacity). A blending procedure can be performed. For example, at a certain distance between the first camera rig and the second camera rig, the second spherical video can start to be shown, but modified to be somewhat translucent. The pixel values can be down-weighted, e.g., by multiplying by a factor less than one. As the user moves more toward the second camera rig, the scaling factor can increase for the second spherical video. Correspondingly, a scaling factor for the first spherical video can decrease as the user moves farther away from the first camera rig.

When a user (as tracked) moves translationally, the proximity of the user to another sphere (e.g., proximity to the other camera rig) can be tracked. When the user is sufficiently close to the other camera rig (e.g., closer to the other camera than to the initial camera rig), the HMD can begin to display the other spherical video. In this manner, for each sphere that the user visits (e.g., as determined by proximity), the user will view the proper parallax for that particular spot that the user is currently at. Thus, the user will perceive the correct visual changes as they move from sphere to sphere.

F. Repositioning Viewpoint to be Off-Center within Spherical Video

In some embodiments, a camera rig can be unable to be located in a second location. For example, the second location can be crowded, dangerous, or already taken by something else. In such embodiments, output of the camera rig can be manipulated such that the camera rig appears to be located in the second location.

In some embodiments, the camera rig can capture content (e.g., a picture or a video) from a first position. The content can be used to create a virtual reality environment from a point of view of the first position. In such examples, the first position can be at a center of a spherical video. However, the point of view of the virtual reality environment can be changed to appear to be from a second position, different from the first position, even though the content is captured from the first position. In such examples, content taken from the first position can be zoomed in or out such that the point of view is in the second position. In some examples, the user's position can be tracked and applied to a movement within the spherical video. In other examples, the user can be set a different zoom factor or positional offset from the spherical video using an on-screen graphical user interface.

In some embodiments, content can be associated with a default zoom. For example, an amount of default zoom can be included in metadata for the content. The amount of default zoom can indicate the amount of zoom should be applied to the content when displayed so that the content appears to be in the second position. Once the default zoom is set, any changes to the amount of zoom can be relative to the default zoom. For example, when a user steps back in a physical world, the virtual reality environment can zoom out from the default zoom to emulate the step back in the virtual reality environment as previously discussed. In some embodiments, the amount of zoom corresponding to an amount of movement in the physical world can be adjusted based an amount of room available in the physical world. For example, a step back in the physical world can correspond to a five-step drop in the virtual reality environment.

In a football context, by zooming in from where the camera rig is located, the reorientation of the point of view allows the camera rig to be located out of the way of a play. For example, the camera rig can be located 8 to 15 yards from the line of scrimmage, as described for the extended view.

FIG. 7 is a flowchart illustrating a method 700 for adjusting a virtual reality (VR) model including a spherical video. Method 700 can be used to adjust a view of a user in a head-mounted display to compensate for recordings in a different view point. For example, the view of the user can be adjusted so that the user begins in a portion of the spherical video that is desired, rather than a portion of the spherical video that was captured by a camera rig. One or more blocks of method 700 can be optional. In some examples, a user can wear a head-mounted display for presenting the VR model, such as a spherical image or video. Images and/or videos viewed by the user can be a portion of the spherical image or video and provided on other displays to be viewed by other users (e.g., a second screen).

At block 710, the spherical video can be stored in a memory of the computer system. In some examples, the memory is communicably coupled with one or more processors of the computer system.

At block 720, a center position of the spherical video can be identified. The center position can correspond to where a camera rig was placed when a video for the spherical video was recorded. In another embodiment, a diameter of the spherical video can be specified in a filed, and a center can be determined in that manner.

At block 730, a displaced position that is a specified distance from the center position can be determined. In some examples, the displaced position is where the spherical video starts. In some embodiments, the displaced position can be indicated by a user or pre-identified. For example, a user can specify at an input of what the displaced position should be. A default can be chosen based on a typical position of where a player starts for a given play, given a specified distance of the player or other players (e.g., a line of scrimmage in football) to the camera, which is at the center of the spherical video.

At block 740, tracking information can be received from one or more sensors on a head-mounted display. In some examples, the tracking information can provide an orientation of the head-mounted display. For example, the tracking information can include a pitch, yaw, and roll of the head-mounted display.

At block 750, a portion of the spherical video can be determined based on the tracking information. In one embodiment, the portion of the spherical video can be dependent on the displaced position. For example, a field of view of the user onto the spherical video can be calculated as if the user is at the displaced position, with the orientation of the tracking information specifying the portion of the spherical video.

At step 760, the portion of the spherical video can be zoomed in or out based on the specified distance to obtain a zoomed portion of the spherical video. The zoomed portion of the spherical video can compensate for any discrepancies introduced into the spherical video by physical restraints of camera placement when taking videos.

At step 770, the zoomed portion of the spherical video can be provided from the computer system to the head-mounted display for displaying on a display screen of the head-mounted display. In some embodiments, the zoomed portion of the spherical video is displayed on a screen for each eye of the user. In other embodiments, the zoomed portion of the spherical video is projected onto the eyes of the user.

VI. Input and Control

A. Input for Headset

An input device for usage in the VR viewer can give the ability to play, pause, fast-forward and rewind at different speeds, as well as move forward or backward in play arrays, hide or show overlays, and tag specific plays. This functionality can be similar to other input devices that many teams use for 2D video review. The input can be performed by a user moving the HMD unit and/or selecting with a remote control device.

In some embodiments, the user can control the playing of a currently selected VR model (e.g., spherical video) based on head movements of the HMD. For example, a user can move the HMD with sufficient speed to cause the VR model to play. The movement of the HMD can be in a specific direction for play and another direction for pause. The VR model can also be paused at a preset time, and the user can control the resuming of playing the VR model by moving the HMD in a particular way. The movement can be required to be of sufficient speed that the movement would not normally occur by a user, except when providing input to control the playing of the VR model.

For example, for a field goal kick, the play can start, and then the video can pause just before the snap. The user (i.e., the kicker) can then "unpause" the video by a sharp head nod (which is how kickers cue the snap in the game). In this manner, the body is involved in an interactive fashion. And, the user can get the same interaction as in a real game, since the video will start based upon a cue from the user.

As another example, the quarterback can control when a play starts via a voice interaction. A particular set of words can be programmed to cause the VR model to start. The set of words would correspond to the cadence that might be used in a game. Once the set of key words are detected by a microphone (e.g., in the HMD or at a separate device that is providing the VR model to the HMD), the spherical video can begin. Motion by the user can also be used. For example, video images of the user can be taken, and visual detection software can identify movements by the user, e.g., as may occur when a quarterback is in a shotgun position.

B. Interface for Selecting Content (e.g., Plays)

In some embodiments, a VR viewer can have both an immersive and non-immersive play selection capabilities. Thus, a user can queue up the plays they want before putting on the VR headset, or can put on the headset and change or choose plays on-the-fly with a 3D graphical user interface (GUI). Coaches can also have the ability to do this for the player outside of VR on a desktop setting, allowing them to change plays without the user knowing the exact plays, allowing for blind tests of play memory. This capability can be important because as team's video libraries increase, a team can want all their old or archived footage to be available. A way to efficiently and meaningfully manage their libraries of content would be desirable. This can be done this with various sorting and filtering capabilities to find their relevant VR content intuitively and quickly.

C. Shared Virtual Pointer

In some embodiments, a first user (e.g., a player) can interact with a virtual reality device (e.g., a head-mounted display). In such embodiments, the head-mounted display can couple to a head of the user to present content to the user. In some examples, the content can be based on a virtual reality (VR) model that includes a spherical video. In such embodiments the content can be a portion of the spherical video. In some embodiments, the head-mounted display can include a left display for a left eye of the user and a right display for a right eye of the user. The portion of the spherical video can be displayed on both of the left display and the right display such that the user can experience the VR model. In other embodiments, the portion of the spherical video can be projected to one or more eyes of the user. In some embodiments, the content in the head-mounted display can change when the head-mounted display is moved.

In some embodiments, the content in the head-mounted display can be projected, or duplicated, on a second screen (e.g., a television, a computer screen, a projection, or any other display system) that a second user (e.g., a coach) can view. In such embodiments, the coach can see on the second screen what the user is viewing in the head-mounted display. By seeing what the playing is viewing, the coach can give instruction and/or training feedback to the user.

Conventionally, the coach can use a laser pointer to point out to the user a particular point in content that the user and the coach are synchronously viewing. However, when the user is viewing the content on the head-mounted display and the coach is viewing the content on the second screen, the user is unable to see anything that the coach points to on the second screen.

Figure 8:
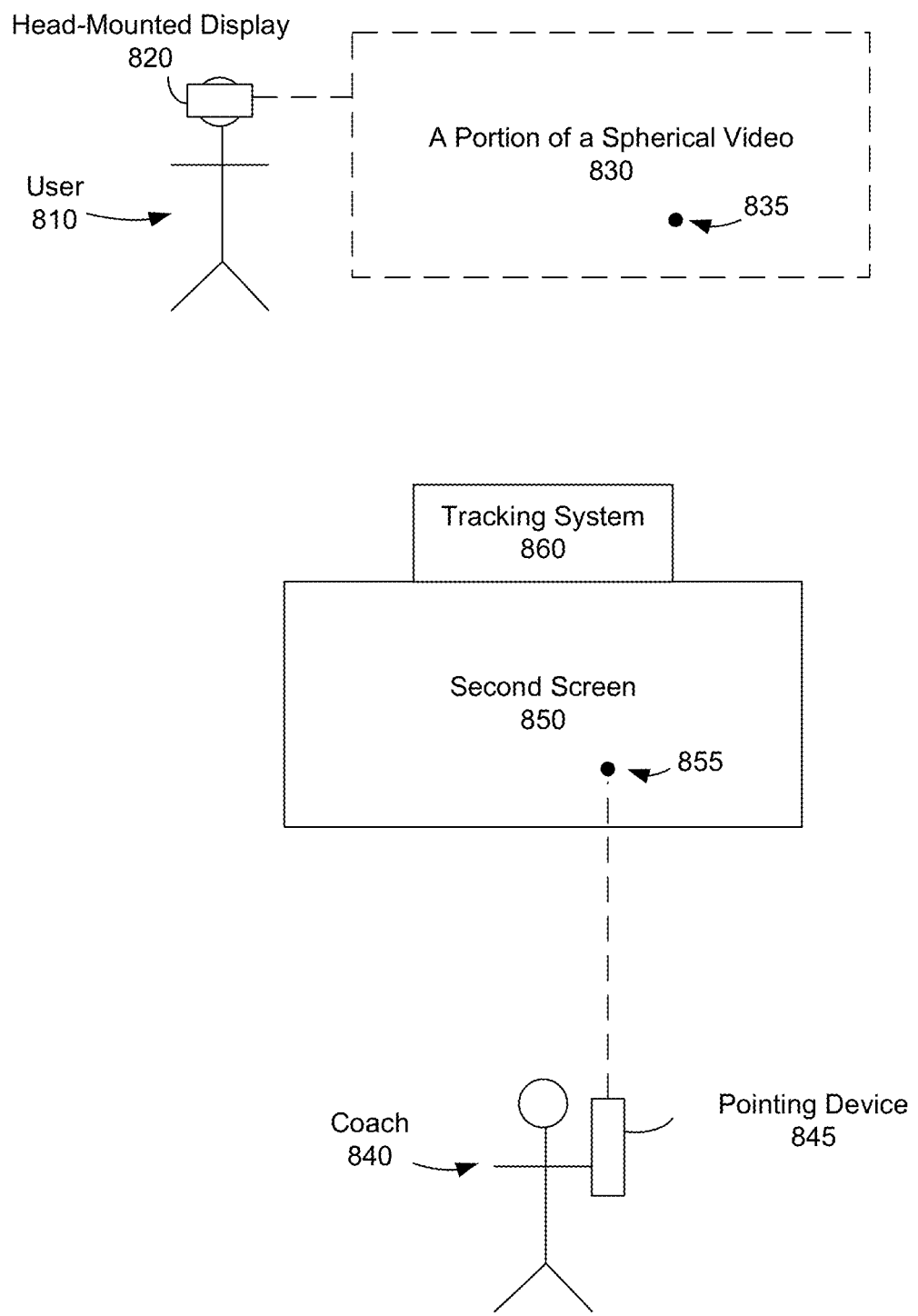
FIG. 8 illustrates an example of a system for generating a virtual pointer in a portion of a spherical video corresponding to a pointer associated with a second screen.

FIG. 8 illustrates an example of a system for generating a virtual pointer 835 in a portion of a spherical video 830 corresponding to a pointer 855 associated with a second screen 850. In some examples, the portion of the spherical video 830 can be presented by a head-mounted display 820, which can be worn by a user 810. The portion of the spherical video 830 can be determined based on an orientation of the head-mounted display 820.

The second screen 850 can be with a tracking system 860. The tracking system 860 can interact with a pointing device 845, depending on a type of the pointing device 845 (which will be described below. A coach 840 can be using the pointing device 845 to put the pointer 855 on the second screen. In some embodiments, the pointer 855 can be generated on the second screen 850. In other embodiments, the pointer 855 can be physically visible on the second screen 850 from a light-emitting component of the pointing device 845.

By having the pointer 855 on the second screen 850, the virtual pointer 835 can be generated in the portion of the spherical video 830. A location that the virtual pointer 835 is generated can correspond to a location of the pointer 855. For example, the portion of the spherical video 830 can be duplicated onto the second screen 850 such that the location of the pointer 855 on the second screen 850 can correspond to a location in the portion of the spherical video 830.

FIG. 9 is a flowchart illustrating an embodiment of a process for synchronizing pointers in a virtual reality (VR) model including a spherical video and on a separate screen. Method 900 can be used to track a location of a pointer on the separate screen and generate a virtual pointer in a portion of the spherical video corresponding to the location to allow a coach to point out something in the portion of the spherical video inside of the head-mounted display. One or more blocks of method 900 can be optional. In some examples, the user can wear the head-mounted display for presenting the portion of the spherical video.

At block 910, the spherical video can be stored in a memory of the computer system. In some examples, the memory communicably coupled with one or more processors of the computer system.

At block 920, tracking information can be received from one or more sensors of the head-mounted display. In some examples, the tracking information can provide a first orientation of the head-mounted display. The tracking information, for example, can be a pitch, yaw, and roll of the head-mounted display.

At block 930, the portion of the spherical video can be determined based on the tracking information. In some examples, the portion of the spherical video can correspond to where the user is looking inside of the head-mounted display.

At block 940, the portion of the spherical video from the computer system can be provided to the head-mounted display for displaying on a display screen of the head-mounted display. In some examples, the portion of the spherical video can be a two-dimensional video. In some embodiments, the two-dimensional video can be displayed on two separate screens, one screen for each eye of the user. In other embodiments, the two-dimensional video can be projected onto each eye of the user.

At block 950, the two-dimensional video can be provided from the computer system to a display device for displaying on the separate screen in synchronization with the head-mounted display. The separate screen can allow for a coach to view what the user if viewing inside of the head-mounted display.

At block 960, location information can be received from a pointing device. In some examples, the location information can identify a location of a first visible pointer on the separate screen. The location can change in a manner dependent on a second orientation of the pointing device. In one embodiment, the first visible pointer can be generated by the computer system, e.g., by receiving the second orientation directly from the pointing device. In another embodiment, the first visible pointer can be created by light emitted from the pointing device onto the second screen. In such an embodiment, a detector system can determine a position of the first visible pointer created by the emitted light.

At block 970, a virtual position on the display screen that corresponds with the location of the first visible pointer on the two-dimensional screen can be determined. The determination of the virtual position can be determined in various ways. For example, a size in physical dimensions or pixel size of the two screens can be determined. Then, a relative position of the first visible pointer on the separate screen can be determined as a percentage or fraction (examples of a calibration point) of the separate screen on the vertical and horizontal axes of the separate screen. The calibration point can be translated to the display screen of the head-mounted display to identify the virtual position that corresponds to the calibration point, e.g., as a fraction of the horizontal and vertical dimensions.

At block 980, a virtual pointer can be generated at the virtual position on the display screen in the portion of the spherical video provided to the head-mounted display The virtual pointer can correspond to the first visible pointer that the coach made using the pointing device. The virtual pointer can allow the coach to point out something in the portion of the spherical video on the second screen for the user to view in the head-mounted display.

1. Pointer with an Orientation Sensor

In some embodiments, the coach can use a pointing device that includes an orientation sensor for detecting at least one or more of yaw, pitch, roll, or any combination thereof of the device (potentially just yaw and pitch). In some embodiments, the orientation sensor can be an inertial measurement unit (IMU), which can have an absolute angular reference or in reference to an arbitrarily chosen coordinate system. In some embodiments, the yaw, pitch, and roll can map to a sphere that the videos are projected onto, with an alignment of the pointing device to the direction that the head-mounted display is pointed.

The pointing device can provide a visual indication (e.g., a red dot) for display on the separate (second) screen via the orientation sensor to determine a location within the sphere. In such embodiments, the orientation sensor can determine a position in the sphere by analyzing a movement of the coach (e.g., when the coach moves a wrist holding the pointing device). The wrist movement can control the visual indication that is generated on the second screen and the head-mounted display.

The pointing device can be a mobile device that includes an application associated with the head-mounted display. The application can include one or more buttons (or other selection mechanisms) that interact with the head-mounted display and the content. For example, a button can rewind, fast forward, tag an element of content, tag the content, or any other feature that influences an experience of a user using the head-mounted display. In some embodiments, the application can run a Virtual-Reality Peripheral Network (VRPN) server on the mobile device and transmit data via WiFi to a rendering machine that is "listening" for the data (VRPN Client) over WiFi. In some embodiments, the application can send data associated with the orientation sensor and/or the one or more buttons to the rendering machine for processing of the data to alter the content displayed on the head-mounted display and the second screen.

In some embodiments, a button on either a controller associated with the head-mounted display, the pointing device, or a keyboard associated with a computer used to control the experience can calibrate the device with the second screen. For example, the button can be pressed to indicate that the pointing device is pointing at a center of the second screen. From there, any movement away from the indicated center of the second screen can be used to move a pointer from the center of the second screen. The amount of movement can be based on an estimated distance of the user from the separate screen, or based on an actual measurement of the distance of the user. The actual distance can be entered into the system (e.g., via keyboard) or measured, e.g., via a light source emitting a light off of the person and detecting the time for the light to be reflected back, where such a source and detector are at known distances from the separate screen, e.g., attached to the separate screen.

The orientation sensor can point from the center of the sphere to a location within the sphere toward the second screen. A calibration process can align the portion of the sphere currently being viewed by the user with the HMD with the center of the screen. For example, a center of the field of view of the HMD can be determined, and the sphere associated with the pointing device can be rotated to align with the current center being viewed by the HMD. This alignment can be performed at every frame, or more or less often. The deviation of the pointing device from its center, as determined by the orientation sensor, can then translate to a particular position on the view of the HMD (e.g., a mounted screen or a screen of an imaging device that projects onto the eye, such as a digital micromirror device (DMD)) as a result of the overall alignment of the spheres and the deviation of the pointing device from its center.

In some embodiments, the device can use Bluetooth (or other wireless or wired communication) to communicate with the rendering machine, a server, a computer, or other device, which communicates with at least one or more of the second screen and the head-mounted display. The render machine can control the visual indication (a 3D model that moves along the surface of the video-textured sphere) based on the wrist movement of the coach. In some embodiments, the visual indication can begin in a center of the second screen. In some embodiments, the visual indication can begin in a center of a field of view of a user of the head-mounted display. In some embodiments, the visual indication can be simultaneously mirrored on the second screen and the head-mounted display so that both the coach and the user can see the visual indication.

In some embodiments, the tracking of the wrist movement of the coach might not be done in an absolute sense when the coach is pointing at the second screen. Rather, the coach can move a wrist of the coach and get feedback relative to a predetermined position and/or orientation. The movement by the wrist can cause the feedback to be presented on both the head-mounted display and the second screen simultaneously. In such embodiments, the tracking of the wrist movement of the coach can be done in a relative sense. The sensors can determine the amount of change from a particular position. In some embodiments, the visual indication can update every frame.

2. 6 Degree of Freedom Device

In some embodiments, a device can be a fully integrated 6 Degree of Freedom (6DOF) device (e.g. HTC Vive's Controllers or Oculus' Touch Controller). The 6DOF device can perform tracking in six degrees. The six degrees can include forward/back, up/down, left/right, pitch, yaw, and roll. A location of the visual indicated can be determined based on the tracking by the 6DOF device.

3. Detection of Light-Emitting Device Near Screen

In some embodiments, the coach can use a device that includes an optical sensor (e.g., infrared sensor or a combination of a depth and optical sensor) so that orientation and position is tracked using the optical sensor. The orientation of the pointing device can be determined based on visual markers that are at a known position relative to the second screen (e.g., at specific positions on the second screen). The optical sensor (e.g., a visual light or infrared camera) can detect where the two or more markers are at on the image generated by the optical sensor, thereby determining the orientation of the pointing device relative to the second screen.

In some embodiments, the optical sensor can detect two or more lights (e.g., infrared light) from a light-emitting device that acts as the visual markers. Light emitted from each end of the light-emitting device (e.g., two lights on either end of the second screen) can be focused onto the optical sensor. In some embodiments, the pointing device can determine a location by using the optical sensor to detect a distance between two or more lights. In such embodiments, the device can compare an actual distance between the two or more lights with the detected distance between the two or more lights to triangulate the device with the second screen. Rotation of the device can also be determined based on a relative angle of the two or more lights on the optical sensor in combination with an inertial measurement unit (IMU) in the device. The IMU can be used when the optical sensor loses tracking of one or more lights. The IMU can be used to figure out the current position/orientation via dead reckoning. In some embodiments, the optical sensor can be used to determine an absolute frame of reference (calibration reference) relative to the second screen, and an IMU can be used later to determine changes in the pointing device from that calibration reference.

In some embodiments, the light-emitting device (including multiple light sources) can be located near the second screen. In such embodiments, the coach can point the device at the second screen to generate a visual indication on the second screen and/or the head-mounted display. The light-emitting device can be placed above, below, to the left, to the right, or any other location around the second screen. In one aspect, the light-emitting device is at a known orientation relative to the second screen, e.g., the two emitted lights can be parallel to a line that bisects the screen (up/down or left/right), with the distance between the lights being known. Instead of lights, any unique visual marker can be used, e.g., a particular fluorescent color that would not normally show up on the second screen.

The position of the pointing device can be determined based on the orientation information, and thus generated by the computer system providing the video. In another embodiment, the pointing device can provide light to the second screen, e.g., as a red dot. The light dot can be emitted at a known spatial relationship from the orientation of the optical sensor, and thus the determined orientation can correspond to the actual visual pointer provided by the light dot.

4. Detection of Light on Screen

In some embodiments, the coach can use a laser pointer, or other device that emits a light, and an optical tracking system to can detect a laser from the laser pointer, or other light emitting device that provides a collimated light beam. The discussion below about such a laser pointer is equally applicable to other such light sources. In some examples, the optical tracking system can include a camera (e.g., mounted to or near the second screen). The optical tracking system can be either attached or near the second screen such that the optical tracking system can observe the second screen. In some examples, the camera can detect the laser by calibrating one or more parameters of a sensor of the camera so that the camera can detect certain intensity levels that are output from a particular kind of laser. The one or more parameters can include gain, sensitivity, and threshold. In this manner, the camera can be set to detect light only (or substantially) from the pointing device, so as to reduce interference from other light sources.

In other examples, the pointing device can emit two light in two different spectrums. Thus, a visible laser pointer can be combined with an infrared (IR) pointer, and the optical tracking system can detect IR light and visible light, or just the IR light, with the visible light being for viewers of the second screen. In other examples, the second screen can include a filter that only makes the laser visible from the sensor. In other examples, the optical tracking system can utilize an interferometer, as described in *Detection of Coherent Light in an Incoherent Background* by R. C. Coutinho et al. In some embodiments, the optical tracking system can identify a size of the second screen. The size of the second screen can be identified by using computer vision and/or image processing, where the optical tracking system is positioned so as to detect light from the second screen (e.g., from an LCD TV). Such a positions can be above or below the TV at an angle that is titled down or up, as the case may be. For example, edges of the second screen can be detected based on brightness of the second screen. For another example, the second screen can display a calibration screen that would allow the size of the second screen to be identified by the computer vision and/or image processing. In other examples, a laser can be pointed at four corners of the second screen to determine a size of the screen. In other embodiments, the optical tracking system can receive the size of the second screen.

The optical tracking system can operate by detecting the laser or the light on the screen. When the optical tracking system detects the laser or the light on the screen, the optical tracking system can generate a visual indication on the head-mounted display in a location corresponding to a location of the laser or the light on the screen. The corresponding location can be determined based on a normalized position (e.g., fraction) of the second screen relative to the display screen for the HMD (which can depend on the distance of a projection from the eye, in embodiments that project onto the eye). For example, the position of the visual pointer on the second screen can be identified as being at position (0.3, 0.7), which corresponds to 30% of the total horizontal distance of the second screen as measured from the lower left corner, and 70% of the total vertical distance of the second screen as measured from the lower left corner. Other values and other corners can be used.

VII. Analytics

Regarding integrated data metrics, as data is currently being captured by all users in VR for rendering purposes it is also being recorded. Video selections, player's login, exact time frame of VR usage, as well as all control button presses (pause, rewind, slow-motion, skip, etc.) can be recorded in order to gain insight about that player's session. In addition, the user's precise head-tracking in degrees of yaw, pitch, and roll can be recorded for post-processing and performance analytics. In various embodiments a real-time visualization and/or a coaches data analytics hub or report can be provided.

The real-time visualization can allow a user or coach to toggle 3D visualization data captured for the user in the VR setting for a play so that the coach can review exactly where the user was looking. This data can also be loaded from any previous session in a similar way.

The coach's hub can import all data captured from previous sessions and summarize relevant statistics, such as aggregated usage, reaction-time, or play memorization. As examples, these can be available locally or can be exported to a server so that coaches can login from a browser and track their players over time from any device.

A. Attention Visualizer

In some embodiments, an attention visualizer can be used. The attention visualizer can be a trail of 3D object "breadcrumbs" to show the players and coaches where the player looked during plays. A player can experience a play, and then relive it while watching where he looked during the previous experience. The breadcrumbs can be used to render this information without it being confusing and distracting. In some embodiments, a user's collected head movement data can be used to generate a two-dimensional video of the user's looking behavior. The two-dimensional video can be reviewed by the coach on a typical or custom made video playback device on a display device (e.g., television, monitor, etc.). The two-dimensional video can be a standard video format (e.g. mp4) and can show a first person view of what the player saw.

In some embodiments, small polygonal models of spheres can be dropped over time, which can use fewer polygons than drawing a continuous line that relates to frame rate and latency. This can create the visual experience of seeing a "dotted line". Additionally or separately, embodiments can vary the color (RGB value) of the spheres to reflect time itself, as the spheres slowly change from red to violet to reflect time.

An optimal distance between the polygon spheres can be chosen to minimize polygons while maximizing the understanding of direction. In addition, after placing the spheres closer to the field of view of the player, embodiments can put the polygon spheres farther out, closer to the surface of the visual sphere itself (away from the center of the visual sphere) as this can help perceiving the scene accurately and comfortably.

B. Attentional Analytics

Data of a player using a head-mounted display can be collected and correlated to determine statistics as compared to others users of the head-mounted display. The statistics can be used to determine aptitude for a new recruit, ability to run particular plays compared to other users, evaluating readiness of back-up players, and other determinations that can be made by comparing a player with one or more other users on the same or similar plays. Additionally, a user's movements can be tracked against one's own previous movements, which can be used to determine which action interval to display next, e.g., a particular difficulty level of a play. For example, whether rain or snow (or other weather) or other obstacles (such as flashes) are to be provided, and at what rate or intensity.

In some examples, a player can be presented a set of about ten plays that are either identical or similar. The ten plays can be randomized from substantially more plays so as to not allow players to memorize the plays. Recordings can be made of one or more characteristics of a player during the plays, the decisions they made, and every action that is recordable and standardized. The recorded data can be paired with in-game metrics, including offensive, defensive, and special teams' efficiency, to build fundamental relationships between data obtained from the head-mounted display and real-world performance on the field. For example, data can be obtained from the head-mounted display from 10 top tier NFL quarterbacks, and 10 subpar quarterbacks to create a differentiation model that measures how efficient and productive specific players perform in certain situations during a football game.

In some examples, the one or more characteristics of a player can be compared with a corresponding one or more characteristics of another user. For example, a team can identify a user that has used the system. In such an example, the team can compare new players to the user that they have identified. In other examples, new one or more characteristics of a player can be compared with previous one or more characteristics of the player. In other examples, a player can be compared with a fictitious player. The fictitious player can be a combination of one or more other users. The combination can be identified based on identifying desired characteristics and combining them to create an optimal player. The desired characteristics can be automatically or manually identified. In some examples, the desired characteristics can be identified by a machine learning algorithm that receives one or more characteristics from two or more players to identify characteristics that indicate success. In some examples, the fictitious player can be program specific. For example, a particular program can include a strength in a particular position. In such an example, the fictitious player would favor the strength.

In some examples, the one or more characteristics can include head movement, body position, eye movement, facial movement, and physiology of a player using the head-mounted display. The head movement can be measured using the head-mounted display. For example, the head-mounted display can record yaw, pitch, and roll of the head-mounted display. Yaw can be defined as an angle measured clockwise in a local horizontal plane from a default location to a forward direction of an object. The default location can be set by a calibration process. Pitch can be defined as an angle between a longitudinal axis of the object and the local horizontal plane. Roll can be defined as a rotation angle about the longitudinal axis between the local horizontal plane and the actual plane of the object. In some examples, the recordings can be received periodically over a period of time (e.g., every second, every 10th of second, etc.).

The body position can also be measured using the head-mounted display. In some examples, the head-mounted display can measure an offset from a point that is configured to be a starting position. From the point, the head mounted device can measure a change in position through a Cartesian coordinate system. For example, a change in an at least one or more of x, y, z, or any combination thereof can be measured. The x can include a plane to a left and right of a player. The y can include a plane above and below the player. And the z can include a plane toward and away from a direction that the player is pointing (e.g., a screen), In such examples, the body position measurements can be measurements of movement of a head of the player.

The eye movement and the facial movement can be measured by a camera inside of the head-mounted display (e.g., using techniques that are known to one skilled in the art). The camera can be facing toward a face of the player. In some examples, the camera can be included in the head-mounted display. In other examples, the camera can be added on, or coupled to, the head-mounted display. The eye movement can include where the eye is looking during a period of time. In some examples, the eye movement can be combined with other characteristics. For example, the eye movement can be combined with the head movement to capture when the player moves their head in a particular direction and looking in an opposite direction. The facial movement can include one or more expressions on a face of the player. For example, the facial movement can include when the player smiles, frowns, clenches their jaw, blinks, or other movement of the face.

The physiology of a player can be measured by one or more sensors (e.g., acquisition software and hardware from Biopac). In some examples, the one or more sensors can be attached, or coupled to, the head-mounted display. In other examples, the one or more sensors can be in contact with the player in a location separate from the head-mounted display (e.g., a sensor on a wrist or a chest of the player). The one or more sensors can monitor various aspects of the player, as will be described below.

A sensor of the one or more sensors can include an electrochemical sensor to analyze sweat of the player. An example of the electrochemical sensor is described in International Application No. PCT/US2013/040671. Another sensor of the one or more sensors can include a skin conductance sensor to measure sweat gland activity. Another sensor of the one or more sensors can include a heart rate monitor to measure attributes associated with a heart rate of the player. In some examples, the heart rate monitor can be configured to measure heart rate variability, which is variation in a time interval between heartbeats. Another sensor of the one or more sensors can include a skin temperature sensor for measuring changes in temperature of the player.

After the one or more characteristics are collected, a characteristic can be summarized to compare to other users. Summarization can include, but is not limited to, average, standard deviation, skewness, max, and/or min. For example, a mean of yaw can indicate where a player is looking during a play. A standard deviation of yaw can indicate an amount of movement. A skewness of yaw can indicate extreme movements. And a max and min of yaw can indicate whether the player viewed the entire field.

One characteristic or a combination of more than one of the characteristics captured (e.g., head movement data, physiological data) can be used to derive a unique and novel metric indicative of a player's proficiency and/or aptitude (referred to as a score). In particular, the score can use unique data captured during training (e.g., head movement, eye movement) as a way to rank player performance relative to other players. In addition, the score can be used to predict performance in particular situations represented during training. The score can also be used as a way to adaptively update training using a head-mounted device (e.g., if a score is above or below a threshold this can dictate whether future training content is made more difficult or easier). As a result, the score can serve as an effective tool with player evaluation and/or development.

As an example, each play can have a difficult score, e.g., based on a formation, an event during the play (e.g., a blitz), weather during the play etc. The score of a play can be calibrated with a user score, e.g., by assigning play scores for advanced users to scores for advanced users. The selection of a next play can be automatic, e.g., a next play can start immediately based on the automated play selection. In another embodiment, the next play selected by the system can be provided to a user, e.g., on a screen of a control computer or on a display of the HMD. User input can select that play and the playback for that play may proceed. Plays can be stored in groups with similar scores. For a given player, plays may be randomly selected within the group that corresponds to the player's current score.

Within a given group, there may be subcategories, e.g., ones for different weather, audio duress, etc. A player can be scored for each of these enhancement, and a sub-score can be determined from performance within plays that are only from that particular subcategory. If the sub-score for one particular subcategory is smaller than other categories of the group, then plays from that category may be selected more often for the user to run through.

1. System

Figure 10:
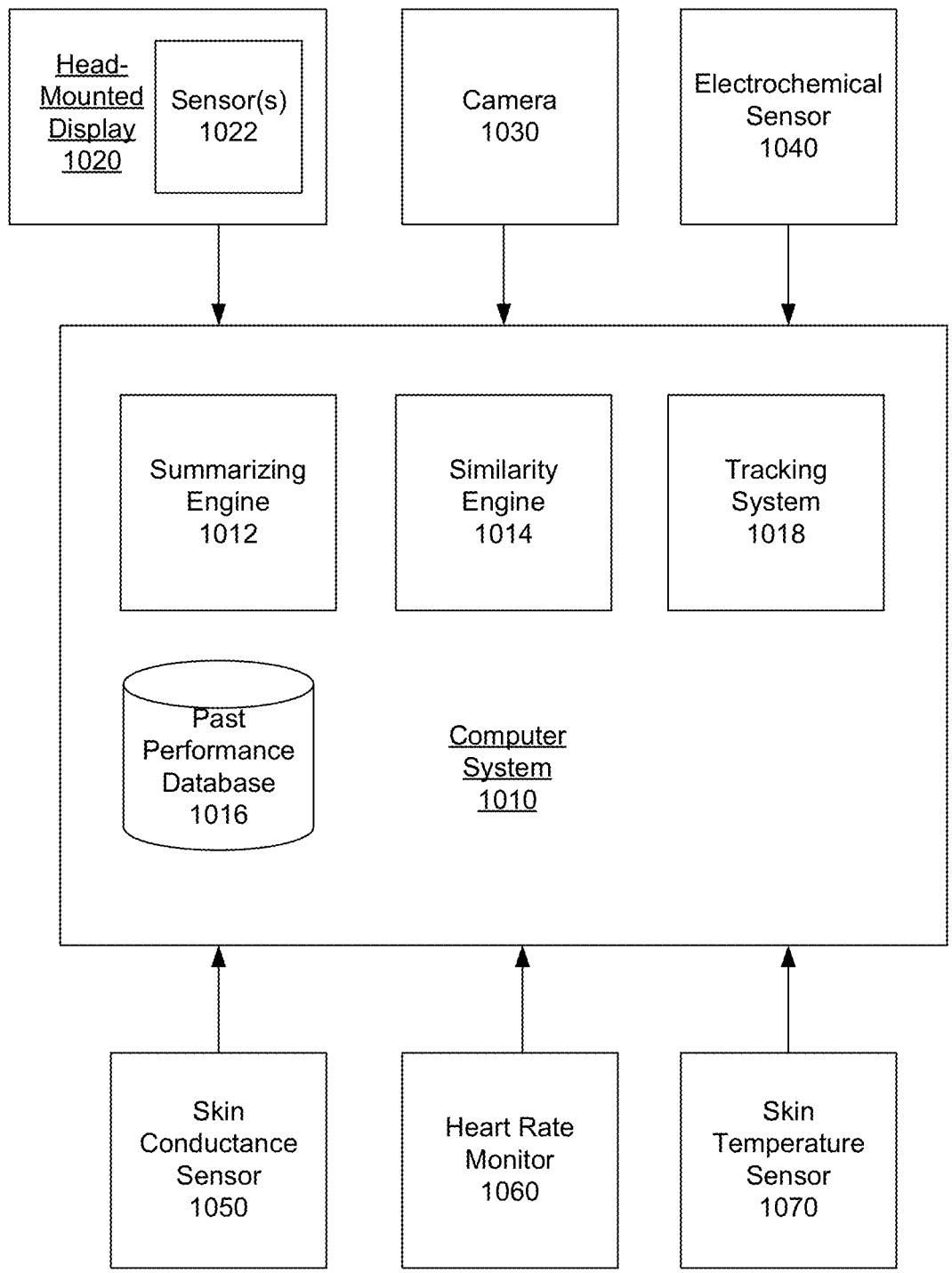
FIG. 10 illustrates a block diagram of an example of a computer system for implementing embodiments of the present disclosure.

FIG. 10 illustrates a block diagram of an example of a computer system 1010 for implementing embodiments of the present disclosure. The computer system 1010 can include a summarizing engine 1012, a similarity engine 1014, and a tracking system 1016. The computer system 1010 can receive data from a number of sources, including a head-mounted display 1020, a camera 1030, an electrochemical sensor 1040, a skin conductance sensor 1050, a heart rate monitor 1060, and a skin temperature sensor 1070. In some embodiments, the head-mounted display 1020 can include one or more sensors (e.g., sensor(s) 1022) as described herein. The head-mounted display 1020 can also include the camera 1030 for recording a face of a user. In other embodiments, the camera 1030 can be used to record a body of the user and body movements for identification purposes.

The summarizing engine 1012 can determine a statistical distribution of values of the orientation from the playback information of the calibration user (e.g., including the orientation information). For example, a measurement can be made periodically for the measured orientation, such as a yaw angle (left and right). The number of values at each orientation can be a measure of amount of time spent at each orientation. The measurements for a given playback can be stored temporarily while a summary is determined and then deleted, or kept for longer periods of time. The summary and full tracking information for a plurality of playbacks for a plurality of users can be stored in a database.

The summarizing engine 1012 can also determine a calibration statistical value for one or more statistical parameters of the statistical distribution. Any number of statistical parameters can be used, and the statistical values for each statistical parameter can be grouped together, and analyzed. For example, all of the skewness values can be analyzed together and clustered into groups (clusters) of varying levels, e.g., based on known performance of those individuals to which the playback corresponds. Each statistical parameter can be allocated a weight for contributing to an overall score of the person, and a distance from any one cluster can be given a particular relationship to a parameter score for that one parameter.

The summarizing engine 1012 can also receive tracking information of a test user over a plurality of times for a respective spherical video. In some examples, a test statistical distribution of values can be determined of the orientation from the playback orientation information of the test user. In such examples, a test statistical value for the one or more statistical parameters of the test statistical distribution can be determined.

The similarity engine 1014 can analyze the statistical values of the plurality of calibration users for each of the one or more statistical parameters to determine a cluster of the calibration statistical values. For example, all of the values of one statistical parameter (e.g., skewness as mentioned above) can be clustered to identify grouping of values corresponding to persons that have been assigned different proficiency for that particular statistical parameter. The different proficiency levels can then determine a scale for the score assigned to any given value for a new test user. The scores for the various statistical parameters being used for a given similarity model can be combined, e.g., as a weighted average.

The tracking system 1016 can track a user using the head-mounted display 1020. The tracking system 1016 can determine a pitch, yaw, and roll of the head-mounted display 1020. The tracking system 1016 can also determine movement of the head-mounted display in x, y, and z (translational movement).

The components of the computer system 1010 can be on one or more computer systems. For example, the tracking system 1016 can be on a first computer system while the summarizing engine 1012 and the similarity engine 1014 are on a second computer system. In other embodiments, each component of the computer system 1010 can be on a separate computer system. In some embodiments, the components of the computer system 1010 can be remotely located, such that the components can communicate over a network (e.g., the Internet). In such embodiments, one or more of the components can be located on the cloud.

2. Method

FIGS. 11A-11B are flowcharts illustrating an embodiment of a process for measuring movement of users in a virtual reality (VR) model including a spherical video. Method 1100 can be used to analyze a person of a user in comparison to other users. One or more blocks of method 1100 can be optional. In some examples, the user can wear a head-mounted display for presenting the VR model, such as a spherical image or video. Images and/or videos viewed by the user can be a portion of the spherical image or video and provided on other displays to be viewed by other users (e.g., a second screen).

At block 1110, spherical videos can be stored in a memory of the computer system. In some examples, the memory can be communicably coupled with one or more processors of the computer system.

At block 1120, for each of a plurality of calibration users, one or more steps can be completed as described in FIG. 11B. For examples, at block 1121, tracking information can be received from one or more sensors of a head-mounted display. In some examples, the tracking information can provide an orientation of the head-mounted display. In some embodiments, the tracking information can include a pitch, yaw, and roll of the head-mounted display. At block 1122, a portion of the respective spherical video that is being viewed by a calibration user can be determined based on the tracking information.

At block 1123, the portion of the respective spherical video can be provided from the computer system to the head-mounted display for displaying on a display screen of the head-mounted display. The portion of the respective spherical video can correspond to where the calibration user is looking inside of the head-mounted device. The portion can be determined based on tracking sensors as described herein.

At block 1124, the tracking information can be stored at a plurality of times over playback of the respective spherical video to obtain playback orientation information of the calibration user. For example, a pitch, yaw, and roll of the head-mounted display can be recorded in order to indicate movements of the user during a time period. At each of a plurality of timestamps, the data can be stored in a list that is structured or unstructured.

At block 1125, a statistical distribution of values of the orientation from the playback orientation information of the calibration user can be determined. The statistical distribution can represent all of the orientations of the calibration user. For example, the statistical distribution can describe how often the calibration user looked in a certain direction. A statistical distribution can be determined as a histogram of the number of times that a particular value of tracking information exists during a given playback. In this manner, a statistical distribution can be created. In some embodiments, more than one statistical parameter can be combined into a single distribution, e.g., yaw and pitch can be combined to provide a two-dimensional distribution. Roll could be added as well. Translation motion is another example of statistical parameters that could be combined.

At block 1126, a calibration statistical value can be determined for one or more statistical parameters of the statistical distribution. Examples of statistical values are provided herein. Besides values such as deviation and skewness, values between data points of the tracking information can be determined. For example, At block average distance between two data points can measure how quickly a player moves their hear. Thus, the values of the tracking information can be ones that are derived from the raw tracking information.

Back to FIG. 11A, at block 1130, the statistical values of the plurality of calibration users can be analyzed for each of the one or more statistical parameters to determine a cluster of the calibration statistical values. Various forms of clustering can be used, both supervised and unsupervised, as will be known by one skilled in the art, such as support vector machines or K-means clustering. In some embodiments, a number of clusters can be specified, e.g., based on known rankings/ratings of players, or based on a desired separation of players.

At block 1140, for a test user, tracking information of the test user can be repeated over the plurality of times for a respective spherical video. In some examples, a test statistical distribution of values can be determined of the orientation from the playback orientation information of the test user. In such examples, a test statistical value for the one or more statistical parameters of the test statistical distribution can be determined.

At block 1150, for each of the one or more statistical parameters, the test statistical values can be compared to the corresponding cluster to determine a separation distance between the test statistical value and the corresponding cluster. The separation distance can correspond to how close the test user is to the calibration users to determine a cluster. In some examples, the closer the test user is to the calibration users, the better the test user is.

At block 1160, a similarity score can be determined between movements of the test user and movement of the plurality of calibration users based on the one or more separation distances. By seeing how similar the test user is, the system can determine an efficiency rating for the test user as compared to the calibration users.

C. Identification of User

To provide analytics for the performance of a user, it is important to identify that a particular user is actually wearing the head-mounted display. Accurate identification is also important for differentiating between types of users: such as the athletes themselves, their position groups, their teams, coaches, or internal company staff and workers. One can provide a user interface where a user can specify a user profile, e.g., by typing name or jersey number into a text box or selecting from a drop down list. The user profile can be identified by a username and/or password. In some examples, the user profile can be a number on a jersey that a person typically uses in a sport. However, people often do not perform such tasks.

To ensure analytics data is accurately assigned to a particular user, embodiments can have a camera that takes an image of the user so as to identify the user. When a user creates a profile, an image can be taken of the user. The image can be of an entire body or focus on certain features, such as the face. Then, recognition software (e.g., facial and/or body recognition software) can be used to identify the person.

In some implementations, the user camera can be a video camera that identifies when the head-mounted display is taken off and a new user puts on the head-mounted display. Sensors in the HMD can also be used to determine when a new user puts on the head-mounted display. The user camera can take images before the new user puts on the head-mounted display. A best quality image can be identified, and that image can be matched to a database of users to determine who the new user is. Then, any data collected from the new user can be assigned to that new user for obtaining analytics about the new user's interaction with the VR model.

In some implementations, one or more characteristics identified by either the head-mounted display and/or one or more sensors associated with the head-mounted display can identify the person. In some examples, the one or more characteristics described below can be used alone or in combination to identify the person. For example, the head-mounted display can identify a height of the person based on a location of the head-mounted display relative to the ground. For another example, one or more settings of the head-mounted display can be used to identify the person. The one or more settings can include an amount of focus, an inter-pupillary distance, or other setting that the person can customize when using the head-mounted display. For another example, the one or more sensors, as described in the attentional analytics section, can determine baseline characteristics of the person for identification purposes. For example, a resting heart rate, a body temperature, or some other characteristic that can be received by the one or more sensors.

In some implementations, a fingerprint and/or retinal scanner can be used to identify the person. The fingerprint and/or retinal scanned can be located on the head-mounted display or separate from the head-mounted display. The fingerprint scanner can be used to start a new play so that the person must use the fingerprint scanner before each play. The retinal scanner can scan one or more eyes of a user periodically or at certain times to determine an identification of the user using the head-mounted display. In some examples, the retinal scanner can scan the person whenever a new play is begun.

VIII. Other Sports

A. Basketball

For basketball, the action interval can involve a player taking a successful shot and falls through the basket. For example, the player can be at a free throw line. The VR model has the player bounce the ball in preparation for the free throw (e.g., in a pattern that the player normally does in a game), and the free throw can be made in the VR model. The camera rig can be placed in front, behind, above, behind, or any combination thereof of the player.

B. Baseball

For baseball, the camera rig can be placed in the batter's box in a location corresponding to a batter, and a pitcher can throw baseballs toward the plate so that the camera captures videos corresponding to what a batter would see. When a user puts on the HMD, the user feels like a batter who is facing the pitcher.

In another example, the camera rig can be placed behind a catcher where an umpire would stand. Thus, the user can get the view of an umpire. A batter can be in the batter box or not. For each pitch, the user can make a decision as to whether the pitch was a strike or a ball. The user can make any suitable indication about whether the pitch was a strike or a ball, e.g., by voice, a hand controller, head movements, etc. The VR software can track whether the pitch corresponding to a particular action interval is a strike or a ball, and the software can track how accurate the user is. Feedback can be provided to the user right after a pitch, and before a next pitch (i.e. a new action interval). Results can show areas of strike zone that the user is less accurate.

IX. Computer System

Figure 12:
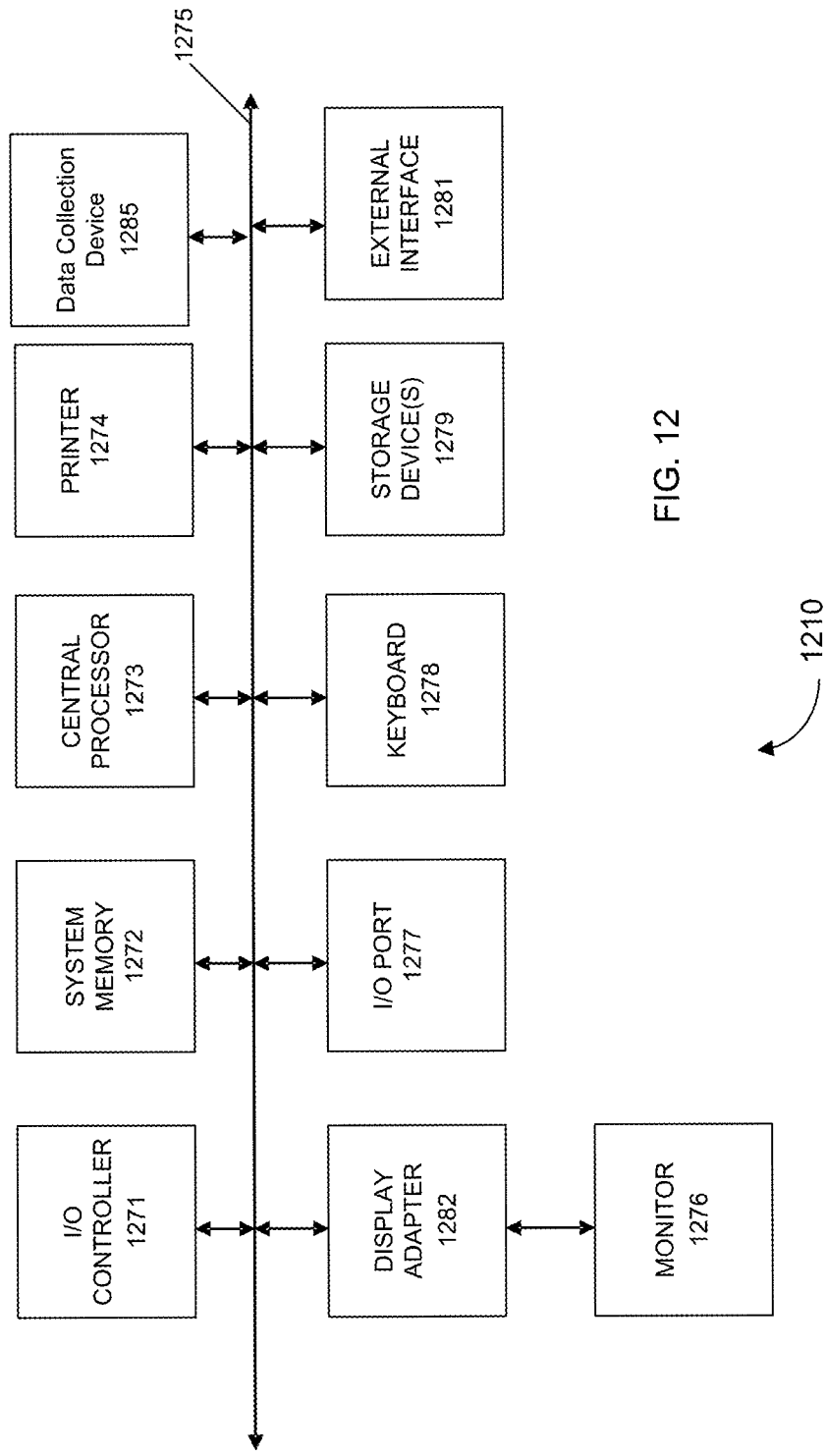
FIG. 12 illustrates a block diagram of an example computer system usable with system and methods according to embodiments of the present disclosure.

Any of the computer systems mentioned herein may utilize any suitable number of subsystems. Examples of such subsystems are shown in FIG. 12 in computer system 1210. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 12 are interconnected via a system bus 1275. Additional subsystems such as a printer 1274, keyboard 1278, storage device(s) 1279, monitor 1276, which is coupled to display adapter 1282, and others are shown. Peripherals and input/output (I/O) devices, which couple to I/O controller 1271, can be connected to the computer system by any number of means known in the art such as input/output (I/O) port 1277 (e.g., USB, FireWire). For example, I/O port 1277 or external interface 1281 (e.g. Ethernet, Wi-Fi, etc.) can be used to connect computer system 1210 to a wide area network such as the Internet, a mouse input device, or a scanner. The interconnection via system bus 1275 allows the central processor 1273 to communicate with each subsystem and to control the execution of instructions from system memory 1272 or the storage device(s) 1279 (e.g., a fixed disk, such as a hard drive, or optical disk), as well as the exchange of information between subsystems. The system memory 1272 and/or the storage device(s) 1279 may embody a computer readable medium. Another subsystem is a data collection device 1285, such as a camera, microphone, accelerometer, and the like. Any of the data mentioned herein can be output from one component to another component and can be output to the user.

A computer system can include a plurality of the same components or subsystems, e.g., connected together by external interface 1281 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for measuring movement of users in a model, the method comprising performing, by a computer system:
storing, in a memory of the computer system, one or more files providing a visual scene, the memory communicably coupled with one or more processors of the computer system;
for each of a plurality of calibration users:
receiving tracking information from one or more sensors of a head-mounted display, the tracking information providing an orientation of the head-mounted display;
determining a portion of a respective visual scene that is being viewed by a calibration user based on the tracking information;
providing the portion of the respective visual scene from the computer system to the head-mounted display for displaying on a display screen of the head-mounted display;
storing the tracking information at a plurality of times over playback of the respective visual scene to obtain playback orientation information of the calibration user;
determining a statistical distribution of values of the orientation from the playback orientation information of the calibration user; and
determining a calibration statistical value for one or more statistical parameters of the statistical distribution;
for each of the one or more statistical parameters, analyzing the calibration statistical values of the plurality of calibration users to determine a cluster of the calibration statistical values;
for a test user, repeating tracking information of the test user over the plurality of times for a respective visual scene, determining a test statistical distribution of values of the orientation from the playback orientation information of the test user, and determining a test statistical value for the one or more statistical parameters of the test statistical distribution;
for each of the one or more statistical parameters, comparing the test statistical value to the corresponding cluster to determine a separation distance between the test statistical value and the corresponding cluster, thereby determining one or more separation distances; and
determining a similarity score between movements of the test user and movements of the plurality of calibration users based on the one or more separation distances.

2. The method of claim 1, wherein the similarity score is further based on at least one or more selected from a body position, eye movement, facial movement, or physiology of the test user and the plurality of calibration users as measured using one or more additional sensors, wherein the tracking information includes pitch, yaw, and roll of the head-mounted display, wherein body position includes translational movement of the head-mounted display, wherein eye movement includes movement of one or more eyes of a user using the head-mounted display, and wherein facial movement includes movement of a face of the user using the head-mounted display.

3. The method of claim 2, wherein a sensor of the one or more additional sensors includes an electrochemical sensor to analyze sweat of the test user, a skin conductance sensor to measure sweat gland activity, a heart rate monitor to measure attributes associated with a heart rate of the user, and a skin temperature sensor for measuring changes in temperature of the user.

4. The method of claim 1, wherein the calibration statistical values are at least one or more of an average, a standard deviation, a skewness, a maximum, a minimum.

5. The method of claim 1, further comprising:
generating a two-dimensional video from the visual scene; and
modifying, in the two-dimension video, objects in the portions of the respective visual scene that are viewed by the test user to indicate the orientation of the head-mounted display to one or more viewers of a separate screen.

6. The method of claim 5, wherein modifying the objects includes dropping polygons to form a line over time.

7. The method of claim 5, further comprising:
varying a color of the objects to reflect time.

8. The method of claim 1, further comprising:
adjusting the respective visual scene to include additional objects based on the similarity score.

9. The method of claim 1, further comprising:
identifying a next visual scene to display based on the similarity score.

10. The method of claim 9, further comprising:
comparing the similarity score to a threshold; and
selecting the next visual scene based on the comparing of the similarity score to the threshold.

11. The method of claim 1, further comprising:
selecting a profile corresponding to the test user from a plurality of profiles based on measurements of the test user.

12. The method of claim 1, wherein the model is a first model and the head-mounted display is a first HMD unit, the method further comprising:
providing the first model to a second head mounted display (HMD) unit, wherein images of the first model are rendered based on motion of the first HMD unit.

13. The method of claim 12, further comprising:
modifying the first model provided to the second HMD unit.

14. The method of claim 13, wherein the modifying the first model includes:
decreasing a field of view provided to the second HMD unit.

15. The method of claim 13, wherein the modifying the first model includes:
providing only a portion of the respective visual scene of the first model to the second HMD unit.

16. The method of claim 13, wherein the modifying the first model includes:
decreasing an opacity of colors in the first model.

17. The method of claim 1, wherein the model is a first model and the head-mounted display is a first HMD unit, the method further comprising:

providing the first model to a second mounted display (HMD) unit, wherein images of the first model are rendered based on motion of the second HMD unit.

18. The method of claim 17, wherein the images of the first model are rendered based on a blend of motions of both the first and second HMD units.

19. The method of claim 1, wherein the model is a virtual reality (VR) model.

20. The method of claim 1, wherein the model includes images obtained from one or more cameras.

21. A computer product comprising a non-transitory computer readable medium storing instructions, that when executed, cause a computer system to perform a method for measuring movement of users in a model, the method comprising:
 storing, in a memory of the computer system, one or more files providing a visual scene, the memory communicably coupled with one or more processors of the computer system;
 for each of a plurality of calibration users:
  receiving tracking information from one or more sensors of a head-mounted display, the tracking information providing an orientation of the head-mounted display;
  determining a portion of a respective visual scene that is being viewed by a calibration user based on the tracking information;
  providing the portion of the respective visual scene from the computer system to the head-mounted display for displaying on a display screen of the head-mounted display;
  storing the tracking information at a plurality of times over playback of the respective visual scene to obtain playback orientation information of the calibration user;
  determining a statistical distribution of values of the orientation from the playback orientation information of the calibration user; and
  determining a calibration statistical value for one or more statistical parameters of the statistical distribution;
 for each of the one or more statistical parameters, analyzing the calibration statistical values of the plurality of calibration users to determine a cluster of the calibration statistical values;
 for a test user, repeating tracking information of the test user over the plurality of times for a respective visual scene, determining a test statistical distribution of values of the orientation from the playback orientation information of the test user, and determining a test statistical value for the one or more statistical parameters of the test statistical distribution;
 for each of the one or more statistical parameters, comparing the test statistical value to the corresponding cluster to determine a separation distance between the test statistical value and the corresponding cluster, thereby determining one or more separation distances; and
 determining a similarity score between movements of the test user and movements of the plurality of calibration users based on the one or more separation distances.

22. The computer product of claim 21, wherein the similarity score is further based on at least one or more selected from a body position, eye movement, facial movement, or physiology of the test user and the plurality of calibration users as measured using one or more additional sensors, wherein the tracking information includes pitch, yaw, and roll of the head-mounted display, wherein body position includes translational movement of the head-mounted display, wherein eye movement includes movement of one or more eyes of a user using the head-mounted display, and wherein facial movement includes movement of a face of the user using the head-mounted display.

23. The computer product of claim 22, wherein a sensor of the one or more additional sensors includes an electrochemical sensor to analyze sweat of the test user, a skin conductance sensor to measure sweat gland activity, a heart rate monitor to measure attributes associated with a heart rate of the user, and a skin temperature sensor for measuring changes in temperature of the user.

24. The computer product of claim 21, wherein the calibration statistical values are at least one or more of an average, a standard deviation, a skewness, a maximum, a minimum.

25. The computer product of claim 21, wherein the method further comprises:
 generating a two-dimensional video from the visual scene; and
 modifying, in the two-dimension video, objects in the portions of the respective visual scene that are viewed by the test user to indicate the orientation of the head-mounted display to one or more viewers of a separate screen.

26. The computer product of claim 25, wherein modifying the objects includes dropping polygons to form a line over time.

27. The computer product of claim 25, wherein the method further comprises:
 varying a color of the objects to reflect time.

28. The computer product of claim 21, wherein the method further comprises:
 adjusting the respective visual scene to include additional objects based on the similarity score.

29. The computer product of claim 21, wherein the method further comprises:
 identifying a next visual scene to display based on the similarity score.

30. The computer product of claim 29, wherein the method further comprises:
 comparing the similarity score to a threshold; and
 selecting the next visual scene based on the comparing of the similarity score to the threshold.

31. The computer product of claim 21, wherein the method further comprises:
 selecting a profile corresponding to the test user from a plurality of profiles based on measurements of the test user.

32. The computer product of claim 21, wherein the model is a first model and the head-mounted display is a first HMD unit, wherein the method further comprises:
 providing the first model to a second head mounted display (HMD) unit, wherein images of the first model are rendered based on motion of the first HMD unit.

33. The computer product of claim 32, wherein the method further comprises:
 modifying the first model provided to the second HMD unit.

34. The computer product of claim 33, wherein the modifying the first model includes:
 decreasing a field of view provided to the second HMD unit.

35. The computer product of claim 33, wherein the modifying the first model includes:

providing only a portion of the respective visual scene of the first model to the second HMD unit.

36. The computer product of claim 33, wherein the modifying the first model includes:
decreasing an opacity of colors in the first model.

37. The computer product of claim 21, wherein the model is a first model and the head-mounted display is a first HMD unit, wherein the method further comprises:
providing the first model to a second mounted display (HMD) unit, wherein images of the first model are rendered based on motion of the second HMD unit.

38. The computer product of claim 37, wherein the images of the first model are rendered based on a blend of motions of both the first and second HMD units.

39. The computer product of claim 21, wherein the model is a virtual reality (VR) model.

40. The computer product of claim 21, wherein the model includes images obtained from one or more cameras.

* * * * *